US011930312B1

(12) United States Patent
Zhang et al.

(10) Patent No.: US 11,930,312 B1
(45) Date of Patent: Mar. 12, 2024

(54) OPEN EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/452,523

(22) Filed: Aug. 19, 2023

Related U.S. Application Data

(63) Continuation of application No. PCT/CN2023/079412, filed on Mar. 2, 2023.

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.
*H04R 25/00* (2006.01)
*H04R 1/10* (2006.01)

(52) U.S. Cl.
CPC .......... *H04R 1/1008* (2013.01); *H04R 1/105* (2013.01); *H04R 1/1066* (2013.01)

(58) Field of Classification Search
CPC ...... H04R 2460/13; H04R 9/06; H04R 11/02; H04R 2400/03; H04R 1/1075
See application file for complete search history.

(56) References Cited

U.S. PATENT DOCUMENTS

2007/0009133 A1 1/2007 Gerkinsmeyer
2016/0134957 A1* 5/2016 Jentz ..................... H04R 1/105 381/380
2020/0137476 A1 4/2020 Shinmen et al.

FOREIGN PATENT DOCUMENTS

CN 209201336 U 8/2019
CN 212909891 U 4/2021
(Continued)

OTHER PUBLICATIONS

International Search Report in PCT/CN2023/079412 dated Jun. 29, 2023, 8 pages.
(Continued)

*Primary Examiner* — Amir H Etesam
(74) *Attorney, Agent, or Firm* — METIS IP LLC

(57) ABSTRACT

The present disclosure relates to an open earphone. The open earphone may include a sound production device and an ear hook including a first part and a second part connected in sequence. The first part may be hooked and arranged between an auricle and a head of a user. The second part may extend to a front lateral surface of the auricle and may be connected to the sound production device. The sound production device may be worn at a position that is near an ear canal without blocking an earhole of the user. The sound production device may be at least partially inserted into an auricular concha cavity of the user. An overlap ratio of a projection area of the sound production device on a sagittal plane to a projection area of the auricular concha cavity on the sagittal plane may be not less than 44.01%.

16 Claims, 18 Drawing Sheets

(56) References Cited

FOREIGN PATENT DOCUMENTS

| | | | |
|---|---|---|---|
| CN | 113573215 | A | 10/2021 |
| CN | 114266240 | A | 4/2022 |
| CN | 114286228 | A | 4/2022 |
| CN | 114390394 | A | 4/2022 |
| CN | 115175069 | A | 10/2022 |
| WO | 2022111485 | A1 | 6/2022 |

OTHER PUBLICATIONS

Written Opinion in PCT/CN2023/079412 dated Jun. 29, 2023, 7 pages.

* cited by examiner

OPEN EARPHONES

CROSS-REFERENCE TO RELATED APPLICATIONS

This application is a continuation of International Application No. PCT/CN2023/079412, filed on Mar. 2, 2023, which claims priority to Chinese Patent Application No. 202211336918.4, filed on Oct. 28, 2022, Chinese Patent Application No. 202223239628.6, filed on Dec. 1, 2022, and International Application No. PCT/CN2022/144339, filed on Dec. 30, 2022, the entire contents of each of which are hereby incorporated by reference.

TECHNICAL FIELD

The present disclosure generally relates to the field of acoustic technologies, and more particularly, relates to open earphones.

BACKGROUND

With a development of acoustic output technologies, an acoustic device (e.g., an earphone) has been widely used in a daily life. The acoustic device may be used with an electronic device (e.g., a mobile phone, a computer, etc.) to provide an auditory feast to a user. The acoustic device may be generally divided into a headset acoustic device, an ear hook acoustic device, an in-ear acoustic device, or the like, according to a wearing manner of the user.

Thus, it is desirable to provide open earphones that are able to improve a wearing comfortability for users and have a good output performance.

SUMMARY

An aspect of the present disclosure provides an open earphone. The open earphone may include a sound production device and an ear hook including a first part and a second part connected in sequence. The first part may be hooked and arranged between an auricle and a head of a user. The second part may extend to a front lateral surface of the auricle and may be connected to the sound production device. The sound production device may be worn at a position that is near an ear canal without blocking an earhole of the user. The sound production device may be at least partially inserted into an auricular concha cavity of the user. An overlap ratio of a projection area of the sound production device on a sagittal plane to a projection area of the auricular concha cavity on the sagittal plane may be not less than 44.01%.

Another aspect of the present disclosure provides an open earphone. The open earphone may include a sound production device and an ear hook including a first part and a second part connected in sequence. The first part may be hooked and arranged between an auricle and a head of a user. The second part may extend to a front lateral surface of the auricle and may be connected to the sound production device. The sound production device may be worn at a position that is near an ear canal without blocking an earhole of the user. The sound production device may be at least partially inserted into an auricular concha cavity of the user. A distance between a projection of an end of the sound production device on a sagittal plane and a projection of an edge of the auricular concha cavity on the sagittal plane may be not greater than 16 mm.

Another aspect of the present disclosure provides an open earphone. The open earphone may include a sound production device and an ear hook including a first part and a second part connected in sequence. The first part may be hooked and arranged between an auricle and a head of a user. The second part may extend to a front lateral surface of the auricle and may be connected to the sound production device. The sound production device may be worn at a position that is near an ear canal without blocking an earhole of the user. The sound production device may be at least partially inserted into an auricular concha cavity of the user. An overlap ratio of a projection area of the sound production device on a sagittal plane to a projection area of the auricular concha cavity on the sagittal plane may be not less than 11.82%.

Another yet aspect of the present disclosure provides an open earphone. The open earphone may include a sound production device and an ear hook including a first part and a second part connected in sequence. The first part may be hooked and arranged between an auricle and a head of a user. The second part may extend to a front lateral surface of the auricle and may be connected to the sound production device. The sound production device may be worn at a position that is near an ear canal without blocking an earhole of the user. The sound production device may be at least partially inserted into an auricular concha cavity of the user. A distance between a projection of an end of the sound production device on a sagittal plane and a projection of an inner contour of the auricle on the sagittal plane may be not greater than 8 mm.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
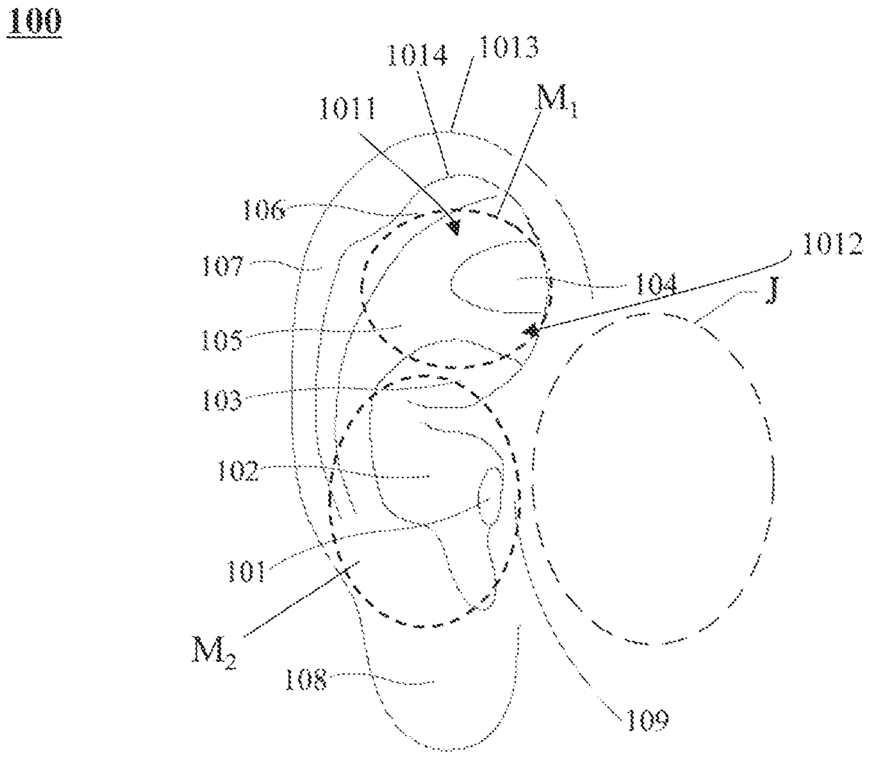
FIG. 1 is a schematic diagram illustrating an exemplary ear according to some embodiments of the present disclosure.

In order to more clearly illustrate the technical solutions of the embodiments of the present disclosure, the following briefly introduces the drawings that need to be used in the description of the embodiments. Obviously, the accompanying drawings in the following description are only some examples or embodiments of the present disclosure, for those skilled in the art, the present disclosure may also be applied to other similar scenarios according to these drawings without any creative effort. Unless obviously obtained from the context or the context illustrates otherwise, the same numeral in the drawings refers to the same structure or operation.

FIG. 1 is a schematic diagram illustrating an exemplary ear according to some embodiments of the present disclosure. As illustrated in FIG. 1, an ear 100 may include an ear canal 101, an auricular concha cavity 102, a cymba of auricular concha 103, a triangular fossa 104, an anthelix 105, a scapha 106, a helix 107, an earlobe 108, a crus of helix 109, an outer contour 1013, and an inner contour 1014. It should be noted that for illustration purposes, an anthelix region illustrated in the embodiments of the present disclosure may include a superior crura of antihelix 1011, an inferior crura of antihelix 1012, and the anthelix 105. In some embodiments, a stable wearing of an acoustic device may be achieved through a support provided by one or more portions of the ear 100 to the acoustic device. In some embodiments, the ear canal 101, the auricular concha cavity 102, the cymba of auricular concha 103, the triangular fossa 104, or the like, may have a certain depth or volume to satisfy a wearing requirement of the acoustic device. For example, the acoustic device (e.g., an in-ear earphone) may be worn in the ear canal 101. In some embodiments, a wearing of the acoustic device may be achieved through another portion of the ear 100 except for the ear canal 101. For example, the wearing of the acoustic device may be achieved through portions such as the cymba of auricular concha 103, the triangular fossa 104, the anthelix 105, the scapha 106, the helix 107, or the like, or a combination thereof. In some embodiments, portions such as the earlobe 108, or the like, of a user may also be used to improve a comfortability and reliability of wearing the acoustic device.

The ear canal 101 of the user may be "released" by achieving the wearing of the acoustic device and a sound propagation through another portion of the ear 100 except for the ear canal 101. When the user wears the acoustic device (an open earphone), the acoustic device may not block the ear canal 101 of the user, so that the user may not only receive the sound transmitted from the acoustic device but also receive the sound (e.g., a whistle sound, a car bell, a surrounding sound from people, a traffic command, etc.) transmitted from an environment, thereby reducing a probability of traffic accidents. In some embodiments, the acoustic device may be designed in a form of structure fitting with the ear 100 according to a structure of the ear 100, so that a sound production device of the acoustic device may be worn at different positions of the ear 100. For example, if the acoustic device is an open earphone, the open earphone may include a suspension structure (e.g., an ear hook) and a sound production device. The sound production device may be connected to the suspension structure through a physical manner, and the suspension structure may be fitted with an auricle shape, so that a whole or part of structure of the sound production device of the ear may be arranged at a front side (e.g., a region J shown in FIG. 1 that is enclosed by a dotted line) of the crus of helix 109. As another example, when the user wearing the open earphone, the whole or part of structure of the sound production device may contact with an outside (e.g., a position where at least one of the crus of helix 109, the cymba of auricular concha 103, the triangular fossa 104, the anthelix 105, the scapha 106, or the helix 107 is located) of the ear canal 101. As further another example, when the user wearing the open earphone, the whole or part of structure of the sound production device may be located in a cavity (e.g., regions M1 and M2 shown in FIG. 1 that are enclosed by dotted lines, the region M1 at least includes the cymba of auricular concha 103 and the triangular fossa 104, and the region M2 at least includes the auricular concha cavity 102) formed by one or more portions (e.g., the auricular concha cavity 102, the cymba of auricular concha 103, the triangular fossa 104, etc.) of the ear.

Individual differences of different users may cause a size difference of the ear such as different shapes, different sizes, or the like. For a convenience of illustration and understanding, if not specified, an ear model with a "standard" shape and size may be mainly used in the present disclosure to further describe a wearing manner of the acoustic device on the ear model in different embodiments. For example, a simulator including a head and an ear (left ear and right ear) that is made based on ANSI: S3.36, S3.25 and IEC: 60318-7, such as GRAS KEMAR, HEAD Acoustics, and B&K 4128 series, or B&K 5128 series, may be used as the reference of wearing the acoustic device to show a scenario that most users wear the acoustic device normally. Taking the GRAS KEMAR as an example, the simulator of the ear may be any one of GRAS 45AC, GRAS 45BC, GRAS 45CC, GRAS 43AG, or the like. Taking the HEAD Acoustics as an example, the simulator of the ear may be any one of HMS II.3, HMS II.3 LN, HMS II.3LN HEC, or the like. It should be noted that a measured data range of the present disclosure is obtained through a measurement based on GRAS 45BC KEMAR. However, it should be understood that a difference between different head models and ear models may exist, and there is a fluctuation of ±10% of a related data range when another model is used. Merely by way of example, an ear used as a reference may include the following features: a size of a projection of an auricle on a sagittal plane along a vertical axis direction may be within a range of 55-65 mm, and a projection of the auricle on the sagittal plane along a sagittal axis direction may be within a range of 45-55 mm. The projection of the auricle on the sagittal plane may be a projection of an edge of the auricle on the sagittal plane. The edge of the auricle may be at least composed of an outer contour of a helix, an earlobe contour, a tragus contour, an intertragal notch, an antitragic apex, an incisura antitragus helicine, or the like. Therefore, the descriptions such as the "a wearing of a user," "in a wearing state," "under a wearing state," or the like, in the present disclosure may indicate that the acoustic device illustrated in the present disclosure is worn on the ear of the simulator mentioned above. Certainly, considering the individual differences of different users, a structure, shape, size, thickness, or the like of the one or more portions of the ear 100 may use a differential design according to the ear with different shapes and sizes. The differential design may be represented as a numerical value of a feature parameter of the one or more portions (e.g., a sound production device, an ear hook, or the like, illustrated below) of the acoustic device may be within different ranges to fit with different ears.

It should be noted that, in the field of medicine, anatomy, or the like, three base tangent planes of a human body may be defined as a sagittal plane, a coronal plane, and a horizontal plane, and three base axes of the human body may be defined as a sagittal axis, a coronal axis, and a vertical axis. The sagittal plane may be a tangent plane perpendicular to a ground along a forward and backward direction of the body, which divides the human body into a left portion and a right portion. The coronal plane may be a tangent plane perpendicular to the ground along a left and right direction of the body, which divides the human body into a front portion and a rear portion. The horizontal plane may be a tangent plane parallel to the ground along an up and down direction of the body, which divides the human body into an upper portion and a lower portion. Correspondingly, the sagittal axis may be an axis perpendicular to the sagittal plane along a forward and backward direction of the body, the coronal axis may be an axis perpendicular to the sagittal plane along a left and right direction of the body, and the vertical axis may be an axis perpendicular to the horizontal plane along an up and down direction of the body. Furthermore, the "front side" of the ear illustrated in the present disclosure may be a side of the ear facing a face region of the human body along the sagittal direction. A schematic diagram illustrating a front side contour of an ear shown in FIG. 1 may be obtained by viewing the ear of the simulator mentioned above along the coronal axis direction of the human body.

The above description regarding the ear 100 is merely provided for the purposes of illustration, and not intended to limit the scope of the present disclosure. For those skilled in the art, various modifications and variations may be made under the guidance of the present disclosure. For example, a part of structure of the acoustic device may cover a whole or part of the ear canal 101. However, these modifications and variations do not depart from the scope of the present disclosure.

Figure 2:
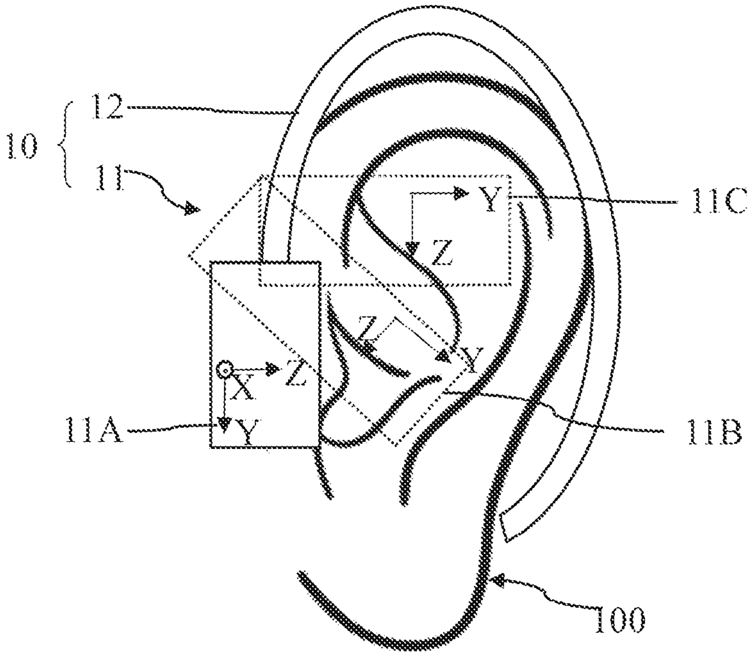
FIG. 2 is a schematic diagram illustrating an exemplary wearing manner of an open earphone according to some embodiments of the present disclosure.

FIG. 2 is a schematic diagram illustrating an exemplary wearing manner of an open earphone according to some embodiments of the present disclosure. As illustrated in FIG. 2, an open earphone 10 may include a sound production device 11 and a suspension structure 12. In some embodiments, the sound production device 11 may be worn on the user body (e.g., a head, neck, or an upper body of a human body) through the suspension structure 12 of the open earphone 10. In some embodiments, the suspension structure 12 may be an ear hook. The sound production device 11 may be connected to an end of the ear hook, and the ear hook may be arranged as a shape fitting with the ear of the user. For example, the ear hook may be in a form of an arc structure. In some embodiments, the suspension structure 12 may also be a clamping structure fitting with the auricle of the user, so that the suspension structure 12 may be clamped on the auricle of the user. In some embodiments, the suspension structure 12 may include but not limited to the ear hook, an elastic band, or the like, so that the open earphone 10 may be well worn on the user body to prevent falling off during a usage of the user.

In some embodiments, the sound production device 11 may be worn on the user body, and a loudspeaker may be arranged in the sound production device 11 to generate sound that is input into the ear 100 of the user. In some embodiments, the open earphone 10 may be combined with a product such as eyeglasses, a headphone, a head-mounted display, an AR/VR helmet, or the like. Under a condition mentioned above, the sound production device 11 may be worn at a position that is near the ear 100 of the user through a suspension or clamping manner. In some embodiments, the sound production device 11 may be in a shape of circular shape, an oval shape, a polygonal shape (regular or irregular), a U-shape, a V-shape, a semi-circular shape, so that the sound production device 11 may be hooked and abut against the ear 100 of the user.

As illustrated in FIG. 1 and FIG. 2, in some embodiments, when the user wears the open earphone 10, at least part of the sound production device 11 may be located at the region J of a front side of the tragus or regions $M_1$ and $M_2$ in the auricle of the ear 100 of the user shown in FIG. 1. An exemplary illustration may be provided combined with different wearing positions (11A, 11B, and 11C) of the sound production device 11. It should be noted that, a front lateral surface of the auricle illustrated in the present disclosure may be a side deviated from the head along the coronal axis direction. Correspondingly, a rear medial surface of the auricle may be a side facing the head along the coronal axis direction. In some embodiments, a sound production device 11A may be located at a side facing a face region of the human body of the ear 100 along the sagittal axis direction. That is, the sound production device 11A may be located at the region J of the front side of the ear 100. Furthermore, a loudspeaker may be arranged in a housing of the sound production device 11A, and at least one sound hole (not shown in FIG. 2) may be arranged on the housing of the sound production device 11A. The sound hole(s) may be located on a sidewall of the housing of the sound production device facing or close to the ear canal 101 of the user, and the loudspeaker may output the sound transmitted to the ear canal 101 of the user through the sound hole(s). In some embodiments, the loudspeaker may include a vibration diaphragm, and a chamber in the housing of the sound production device 11 may be at least divided into a front chamber and a rear chamber through the vibration diaphragm. The sound hole may be acoustic coupled to the front chamber. A vibration of the vibration diaphragm may drive air in the front chamber to vibrate to generate air-conduction sound, and the air-conduction sound generated from the front chamber may be propagated to the outside through the sound hole(s). In some embodiments, the housing of the sound production device 11 may include one or more pressure relief holes, and the pressure relief hole(s) may be located at a sidewall of the housing that is adjacent or opposite to the sidewall where the sound hole is located. The pressure relief hole(s) may be acoustic coupled to the rear chamber. The vibration of the vibration diaphragm may also drive air in the rear chamber to vibrate to generate the air-conduction sound, and the air-conduction sound generated from the rear chamber may be propagated to the outside through the pressure relief hole(s). Merely by way of example, in some embodiments, the loudspeaker in the sound production device 11A may output sounds with a phase difference (e.g., an opposite phase) through the sound hole(s) and the pressure relief hole(s), respectively. The sound hole(s) may be located at a sidewall of the housing of the sound production device 11A facing the ear canal 101 of the user, and the pressure relief hole(s) may be located at a side of the housing of the sound production device 11 deviated from the ear canal 101 of the user. The housing may act as a baffle to increase an acoustic path difference from the sound hole(s) and the pressure relief hole(s) to the ear canal 101, so that a sound intensity at the ear canal 101 may be increased, and a volume of a far-field leakage may be reduced. In some embodiments, the sound production device 11 may include a long axis direction Y and a short axis direction Z orthogonal to each other, and the long axis direction Y and the short axis direction Z are perpendicular to a thickness direction X. The long axis direction Y may be defined as a direction with a greatest extension size (e.g., when a projection shape is a rectangle or substantially rectangle, the long axis direction may be a length direction of the rectangle or substantially rectangle) of a two-dimensional projection (e.g., a projection of the sound production device 11 on a plane where the lateral surface is located, or on the sagittal plane) shape of the sound production device 11. The short axis direction Z may be defined as a direction perpendicular to the long axis direction Y (e.g., when a projection shape is a rectangle or substantially rectangle, the short axis direction may be a width direction of the rectangle or substantially rectangle) of a projection shape of the sound production device 11 on the sagittal plane. The thickness direction X may be defined as a direction perpendicular to a two-dimensional projection plane. For example, the thickness direction X may be the same as the coronal axis direction, which indicates the left and right direction of the body. In some embodiments, when the sound production device 11 is in a tilt state under the wearing state, the long axis direction Y may be parallel to the short axis direction Z or substantially parallel to the sagittal plane. A certain angle may be formed between the long direction axis Y and the sagittal axis direction. That is, the long axis direction Y may be arranged to be tilted. A certain angle may be formed between the short direction axis Z and the vertical axis direction. That is, the short axis direction Z may also be arranged to be tilted, which is illustrated as the wearing manner of the sound production device 11B shown in FIG. 2. In some embodiments, a whole or part of the structure of the sound production device 11B may be inserted into the auricular concha cavity. That is, a projection of the sound production device 11B on the sagittal plane may overlap with a projection of the auricular concha cavity on the sagittal plane. More details about the sound production device 11B may be found elsewhere in the present disclosure, such as FIG. 3 and the related descriptions thereof. In some embodiments, the sound production device may be in a horizontal or substantially horizontal state under the wearing state, which is illustrated as the sound production device 11C shown in FIG. 2. The long axis direction Y may be consistent with or substantially consistent with the sagittal axis direction, which indicates the forward and backward direction of the body. The short axis direction Z may be consistent with or substantially consistent with the vertical axis direction, which indicates the up and down direction of the body. It should be noted that, under the wearing state, the sound production device 11C may be in the substantially horizontal state, which indicates that an angle between the long axis direction and the sagittal direction of the sound production device 11C may be within a specific range (e.g., not greater than 20°). In addition, a wearing position of the sound production device 11 may be not limited to the sound production device 11A, the sound production device 11B, and the sound production device 11C shown in FIG. 2, which satisfies the region J, the region $M_1$, or the region $M_2$ shown in FIG. 1. For example, the whole or part of structure of the sound production device 11 may be located in the region J shown in FIG. 1 enclosed by the dotted line. As another example, the whole or part of structure of the sound production device 11 may contact with positions where one or more portions such as the crus of helix 109 of the ear canal 101, the cymba of auricular concha 103, the triangular fossa 104, the anthelix 105, the scapha 106, the helix 107, or the like, are located. As another example, the whole or part of structure of the sound production device 11 may be located in the cavity (e.g., regions M1 and M2 shown in FIG. 1 that are enclosed by dotted lines, wherein the region M1 at least includes the cymba of auricular concha 103 and the triangular fossa 104, and the region M2 at least includes the auricular concha cavity 102) formed by one or more portions (e.g., the auricular concha cavity 102, the cymba of auricular concha 103, the triangular fossa 104, etc.) of the ear 100.

To improve the reliability of the open earphone 10 under the wearing state, the open earphone 10 may use any one of the following manners or a combination thereof. Firstly, at least part of the suspension structure 12 may be arranged as an imitated structure attached to at least one of the rear medial surface of the auricle and the head to increase a contact area between the suspension structure 12 and the ear and/or the head, thereby increasing a falling resistance of the acoustic device 10 from the ear. Secondly, at least part of the suspension structure 12 may be arranged as an elastic structure, so that the suspension structure 12 may have a deformation quantity under the wearing state to increase a positive pressure of the suspension structure 12 on the ear and/or the head, thereby increasing a falling resistance of the open earphone 10 from the ear. Thirdly, at least part of the suspension structure 12 may be arranged to abut against the ear and/or the head under the wearing state to form a reaction force holding and pressing the ear, so that the sound production device 11 may hold and press the front lateral surface (e.g., regions $M_1$ and $M_2$ shown in FIG. 1) of the auricle, thereby increasing a falling resistance of the open earphone 10 from the ear. Fourthly, the sound production device 11 and the suspension structure 12 may be arranged to clamp the anthelix region, a region where the auricular concha cavity is located, or the like, from the front lateral surface to the rear medial surface of the auricle under the wearing state, thereby increasing a falling resistance of the open earphone 10 from the ear. Fifthly, the sound production device 11 and a structure connected to the sound production device 11 may be arranged at least partially inserted into a cavity such as the auricular concha cavity 102, the cymba of auricular concha 103, the triangular fossa 104, the scapha 106, or the like, thereby increasing a falling resistance of the open earphone 10 from the ear.

Figure 3:
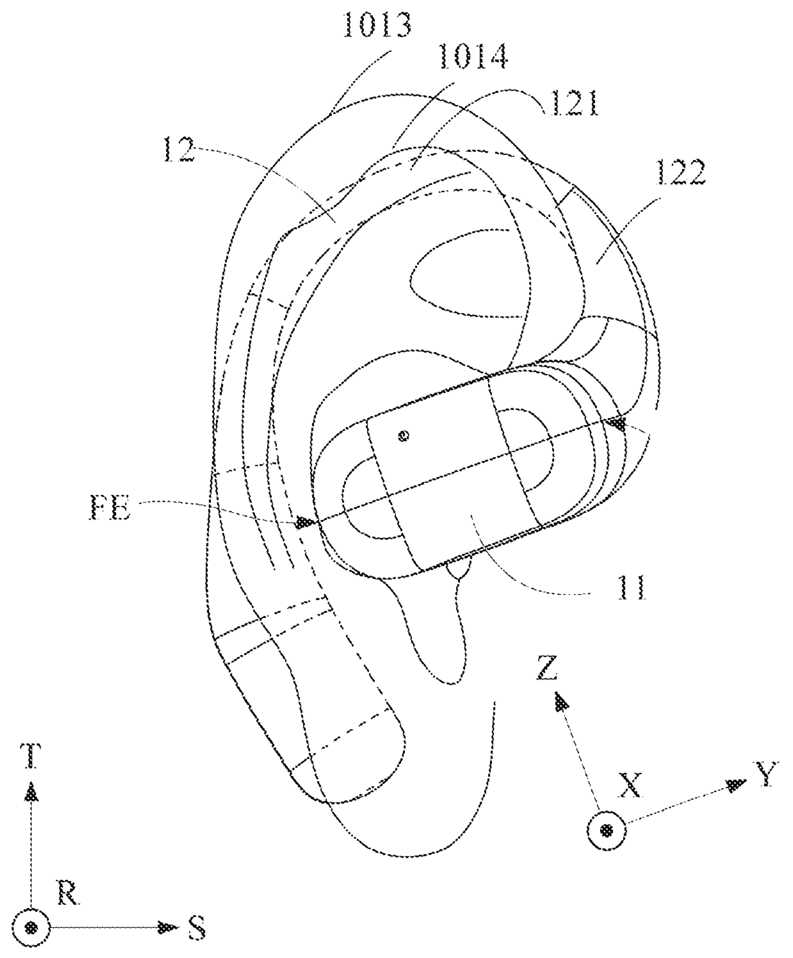
FIG. 3 is a schematic diagram illustrating a wearing manner that a sound production device of an open earphone is inserted into an auricular concha cavity according to some embodiments of the present disclosure.

Merely by way of example, combined with FIG. 3, an end FE (also referred as a free end) of the sound production device 11 may be inserted into the auricular concha cavity under the wearing state. Alternatively, the sound production device 11 and the suspension structure 12 may be arranged to clamp an ear region mentioned above from a front side and a rear side of ear region corresponding to the auricular concha cavity, thereby increasing a falling resistance of the open earphone 10 from the ear, and further improving the reliability of the open earphone 10 under the wearing state. For example, the end FE of the sound production device may be held and pressed in the auricular concha cavity along the thickness direction X. As another example, the end FE may abut against the inside (e.g., abut against an inner wall of the auricular concha cavity relative to the end FE) of the auricular concha cavity along the long axis direction Y and/or the short axis direction Z. It should be noted that the end FE of the sound production device 11 may be an end arranged opposite to a fixed end of the sound production device 11 connected to the suspension structure 12, which also is referred as the free end. The sound production device 11 may be a structure body in a regular shape or irregular shape. An exemplary further illustration is provided for the end FE of the sound production device 11. For example, when the sound production device 11 is in a shape of rectangle, a wall surface of the end of the sound production device 11 may be a planar surface, and the end FE of the sound production device 11 may be a sidewall of the end arranged opposite to the fixed end of the sound production device 11 connected to the suspension structure 12. As another example, when the sound production device 11 is in a shape of sphere, ellipsoid, or irregular structure body, the end FE of the sound production device 11 may be a specific region far away from the fixed end obtained by dividing the sound production device 11 along a Y-Z plane (a plane formed by the short axis direction Z and the thickness direction X). A ratio of a size of the specific region along the long axis direction Y to a size of the sound production device 11 along the long axis direction Y may be within a range of 0.05-0.2.

Figure 4:
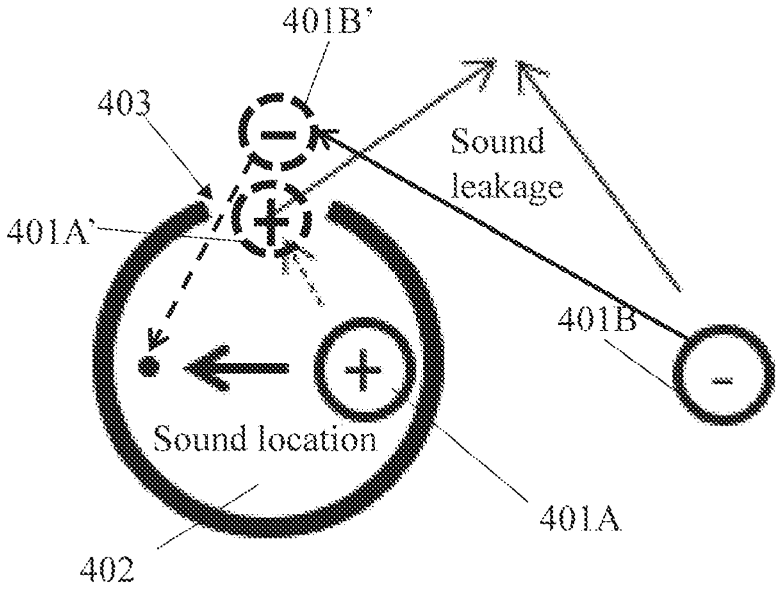
FIG. 4 is a schematic diagram illustrating an acoustic model with a cavity-like structure according to some embodiments of the present disclosure.

A sound volume of a sound location (e.g., an earhole), especially a sound volume with medium and low frequency, may be improved through the sound production device 11 that is partially inserted into the auricular concha cavity, and a good effect of far-field leakage cancellation may also be kept. Merely by way of example, when the whole or part of the structure of the sound production device 11 is inserted into the auricular concha cavity 102, the sound production device 11 and the auricular concha cavity 102 may form a structure similar to a cavity (the following is referred to as a cavity-like structure). In the embodiments of the present disclosure, the cavity-like structure may be understood as a semi-closed structure enclosed by a sidewall of the sound production device 11 and the auricular concha cavity 102. The semi-closed structure may ensure that the sound location (e.g., an earhole) is not completely closed and isolated from the outer environment, but have a leakage structure (e.g., an opening, a gap, a pipeline, etc.) in an acoustic communication with the outer environment. When the user wears the open earphone 10, one or more sound holes may be arranged on a side of the housing of the sound production device 11 close to or facing the ear canal of the user, and one or more pressure relief holes may be arranged on another sidewall (e.g., far away or deviated from a sidewall of the ear canal of the user) of the housing of the sound production device 11. The sound hole(s) may be acoustic coupled to the front chamber of the open earphone 10, and the pressure relief hole(s) may be acoustic coupled to the rear chamber of the open earphone 10. Taking the sound production device 11 including a sound hole and a pressure relief hole as an example, sound output from the sound hole and sound output from the pressure relief hole may be substantially considered as two sound sources. The sound of the two sound sources may have opposite phases to form a dipole. The sound production device 11 and an inner wall corresponding to the auricular concha cavity may form the cavity-like structure. The sound source corresponding to the sound hole may be located in the cavity-like structure, and the sound source corresponding to the sound relief hole may be located at the outside of the cavity-like structure to form an acoustic model shown in FIG. 4. As illustrated in FIG. 4, a cavity-like structure 402 may include a sound location and at least one sound source 401A. The word "include" herein may indicate that at least one of the sound location and the sound source 401A is located in the cavity-like structure 402, or at least one of the sound location and the sound source 401A is located at an inner edge of the cavity-like structure 402. The sound location may be equivalent to the earhole of the ear or may be an acoustic reference point of the ear, such as ERP, DRP, or the like, or may be an inlet structure conducted to a sound listener, or the like. A sound source 401B may be located at the outside of the cavity-like structure, and the sound source 401A and the sound source 401B with opposite phases may form a dipole. The dipole may emit sound to a surrounding space respectively to generate an interference cancellation phenomenon of acoustic waves, thereby achieving an effect of leakage cancellation. Since two sounds may have the greatest acoustic path difference at the sound location, thus, the effect of sound interference cancellation may be not obvious relatively, and the sound with a greater volume may be received at the sound location compared with other locations. Specifically, since the sound source 401A is wrapped by the cavity-like structure 402, most sounds emitted from the sound source 401A may not reach to the sound location. Therefore, an arrangement of the cavity-like structure 402 may increase the sound volume of the sound reaching to the sound location significantly. At the same time, merely a minor part of sounds with an opposite phase emitted from the sound source 401B with an opposite phase located at the outside of the cavity-like structure 402 may enter the cavity-like structure 402 through the leakage structure 403 of the cavity-like structure 402, which is equivalent to a secondary sound source 401B' generated at the leakage structure 403. An intensity of the sound source 401B' may be less than an intensity of the sound source 401B significantly, and also less than an intensity of the sound source 401A significantly. An effect of a reverse-phase cancellation generated by the sound emitted from the secondary sound source 401B' in the cavity may be weak relative to the sound source 401A, so that the sound volume at the sound location may be increased significantly. For a sound leakage, sound emitted from the sound source 401A through the leakage structure 403 to the outside may be equivalent to a secondary sound source 401A' generated at the leakage structure 403. Since almost all sounds emitted from the sound source 401A are output through the leakage structure 403, and a size of the cavity-like structure 402 is far less than a space size (a difference with at least an order of magnitude) evaluating the sound leakage, an intensity of the secondary sound source 401A' may be considered as equivalent to an intensity of the sound source 401A. For the outer space, the effect of the sound cancellation generated by the secondary sound source 401A' and the sound source 401B may be equivalent to the effect of the sound cancellation generated by the sound source 401A and the sound source 401B. That is, the cavity-like structure may still keep an equivalent effect of reducing the sound leakage.

In a specific application scenario, an outer wall surface of the housing of the sound production device 11 may usually be a planar surface or a curve surface. A contour of the auricular concha cavity may be a ragged structure. A cavity-like structure that is in communication with the outside may be formed between the sound production device 11 and the contour of the auricular concha cavity through the whole or part of the structure of the sound production device 11 inserted into the auricular concha cavity. Furthermore, the acoustic model shown in FIG. 4 may be formed by arranging the sound hole(s) at a position of the housing of the sound production device facing the ear canal of the user and close to an edge of the auricular concha cavity and arranging the pressure relief hole(s) at a position of the sound production device 11 deviated from or far away from the earhole, thereby increasing the sound location at the earhole of the user when the user wears the open earphone and reducing the effect of the far-field sound leakage.

In some embodiments, the sound production device of the open earphone may include a transducer and a housing used to accommodate the transducer. The transducer may be an element that is able to receive an electrical signal and transform the electrical signal as an output sound signal. In some embodiments, divided based on a frequency, a type of the transducer may include a low frequency (e.g., 30 Hz~150 Hz) loudspeaker, a medium and low frequency (e.g., 150 Hz~500 Hz) loudspeaker, a medium and high frequency (e.g., 500 Hz~5 kHz) loudspeaker, a high frequency (e.g., 5 kHz~16 kHz) loudspeaker, or a full frequency (e.g., 30 Hz~16 kHz) loudspeaker, or a combination thereof. The low frequency, high frequency, or the like, illustrated herein merely represents an approximate range of frequency, and for different application scenarios, the dividing manner may be different. For example, a frequency division point may be determined, the low frequency may represent a frequency range below the frequency division point, and the high frequency may represent frequencies above the frequency division point. The frequency division point may be any value within an audible range of the human ear, such as 500 Hz, 600 Hz, 700 Hz, 800 Hz, 1000 Hz, etc.

In some embodiments, the transducer may include a vibration diaphragm. When the vibration diaphragm vibrates, the sound may be emitted from a front side and a rear side of the vibration diaphragm. In some embodiments, a front chamber (not shown in the figures) used to transmit the sound may be arranged at a position of a front side of the vibration diaphragm in the housing 120. The front chamber may be acoustic coupled to the sound hole(s), and the sound of the front side of the vibration diaphragm may be emitted from the sound hole(s) through the front chamber. A rear chamber (not shown in the figure) used to transmit the sound may be arranged at a position of a rear side of the vibration diaphragm in the housing 120. The rear chamber may be acoustic coupled to the pressure relief hole(s), and the sound of the rear side of the vibration diaphragm may be emitted from the pressure relief hole(s) through the rear chamber.

As illustrated in FIG. 3, an illustration of an exemplary ear hook used as the suspension structure 12 is provided herein. In some embodiments, the ear hook may include a first part 121 and a second part 122 connected in sequence. The first part 121 may be hooked and arranged between the auricle and the head of the user, and the second part 122 may extend to the outer side (a side of the ear deviated from the head of the human body along the coronal axis direction) of the ear to be connected to the sound production device 11, so that the sound production device 11 may be worn at a position that is near the ear canal without blocking the earhole of the user. In some embodiments, the sound hole(s) may be arranged at a sidewall of the housing facing the auricle, so that the sound generated by the transducer may be conducted to the outside of the housing and transmitted to the earhole of the user.

Figure 5:
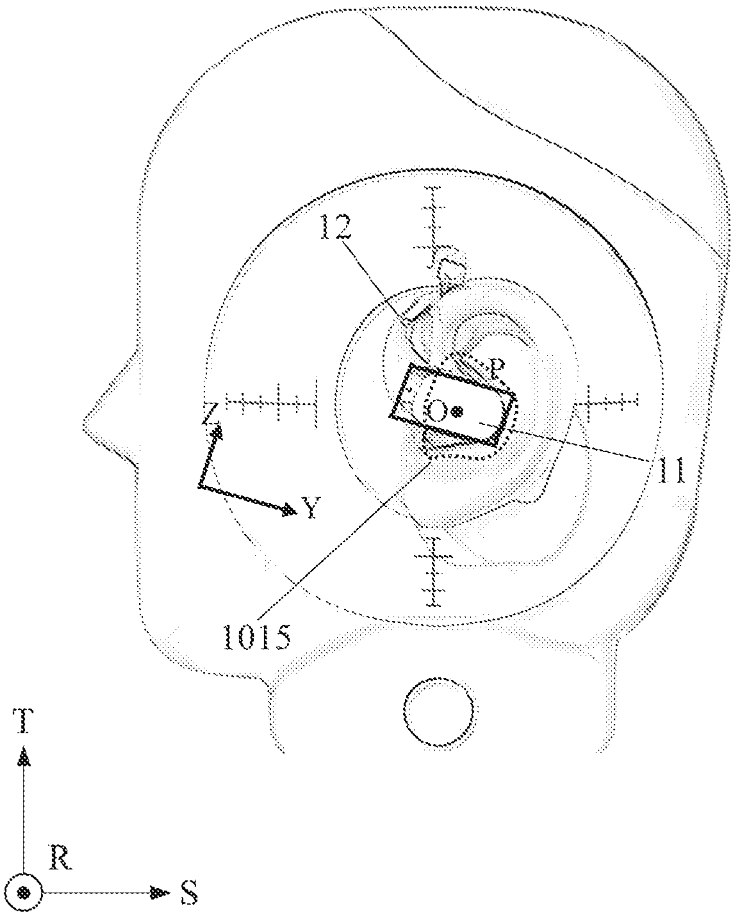
FIG. 5 is a schematic diagram illustrating an exemplary wearing manner of an open earphone according to some embodiments of the present disclosure.

FIG. 5 is a schematic diagram illustrating an exemplary wearing manner of an open earphone according to some embodiments of the present disclosure.

As illustrated in FIG. 3 and FIG. 5, in some embodiments, when the user wears the open earphone 10, the sound production device 11 may have a first projection on the sagittal plane (i.e., a plane formed by a T axis and a S axis shown in FIG. 5) along the sagittal axis direction R. A shape of the sound production device 11 may be a regular or an irregular three-dimensional shape. Correspondingly, a shape of the first projection of the sound production device 11 on the sagittal plane may be a regular or an irregular shape. For example, when the shape of the sound production device 11 may be a cuboid, similar to a cuboid, and a cylinder, the shape of the first projection of the sound production device 11 on the sagittal plane may be a rectangle or similar to a rectangle (e.g., a runway shape). Considering that the shape of the first projection of the sound production device 11 on the sagittal plane may be an irregular shape, for a convenience illustration of the first projection, a rectangular region defined by a solid frame P may be delineated around the projection (i.e., the first projection) of the sound production device 11 shown in FIG. 5, and a centroid O of the rectangular region defined by the solid frame P may be substantially considered as a centroid of the first projection. It should be noted that the illustrations above regarding the first projection and the centroid of the first projection are merely an example, and the shape of the first projection may be related to the shape of the sound production device 11 or the wearing state of the sound production device 11 relative to the ear. In some embodiments, the sound production device 11 and the suspension structure 12 may be independent structures or an integrated structure. For describing the first projection region of the sound projection device 11 more clearly, the thickness direction X, the long axis direction Y, and the short axis direction Z may be introduced according to a three-dimensional structure of the sound production device 11. The long axis direction Y may be perpendicular to the short axis direction Z, and the thickness direction X may be perpendicular to a plane formed by the long axis direction Y and the short axis direction Z. Merely by way of example, the solid frame P may be determined based on the following process: two points with the maximum distance of the sound production device 11 may be determined along the long axis direction Y, and a first line segment and a second line segment parallel to the short axis direction Z may be determined through the two points respectively. Two points with the maximum distance of the sound production device 11 may be determined along the short axis direction Z, and a third line segment and a fourth line segment parallel to the long axis direction Y may be determined through the two points respectively. The rectangular region defined by the solid frame P shown in FIG. 5 may be obtained based on a region formed by the first line segment, the second line segment, the third line segment, and the fourth line segment.

Figure 6:
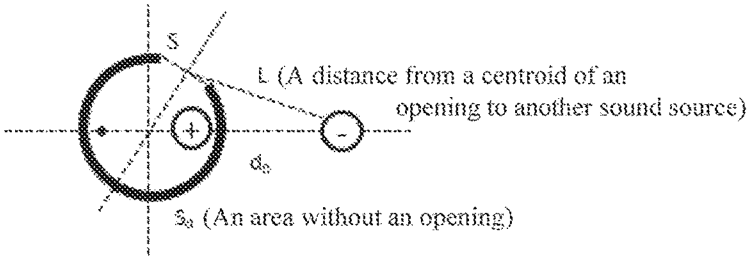
FIG. 6 is a schematic diagram illustrating a cavity-like structure according to some embodiments of the present disclosure.
Figure 7:
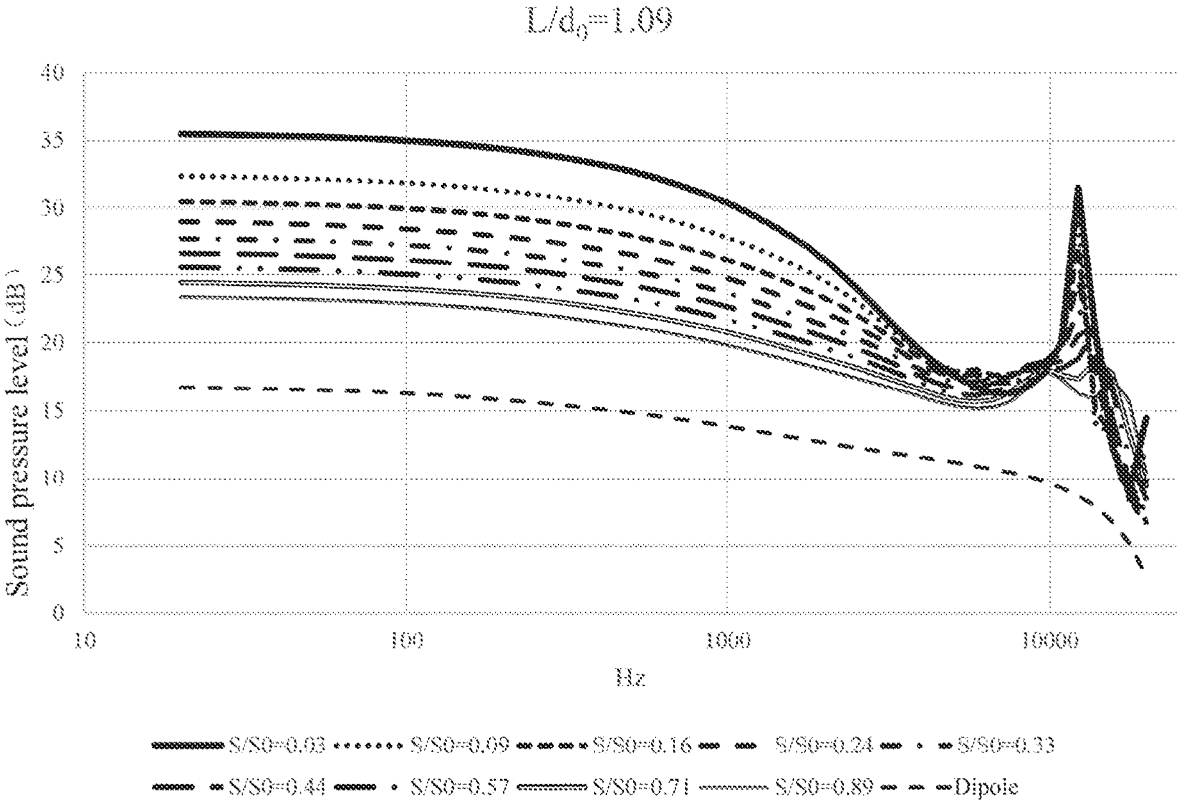
FIG. 7 is a curve diagram illustrating a sound index of a cavity-like structure including a leakage structure with different sizes according to some embodiments of the present disclosure.

As illustrated above, when the user wears the open earphone 10, the acoustic model shown in FIG. 4 may be formed by the sound production device 11 at least partially inserted into the auricular concha cavity. Since the sound production device 11 cannot be fitted with the auricular concha cavity closely and completely, thus, a gap may be formed, and the gap may correspond to the leakage structure 403 shown in FIG. 4. That is, when the open earphone is in the wearing state, and the whole or part of the structure of the sound production device 11 may be inserted into the auricular concha cavity, the projection of the sound production device 11 on the sagittal plane may have an overlap region with the projection of the auricular concha cavity on the sagittal plane. Furthermore, a size of an opening area of the leakage structure 403 of the cavity-like structure 403 may be affected by an overlap ratio of the overlap region. For example, if the overlap ratio of the sound production device 11 to the auricular concha cavity is great, the sound production device 11 may cover a large part of region of the auricular concha cavity. At this time, a gap size between the sound production device 11 and the auricular concha cavity may be small. That is, the size of the opening area of the leakage structure 403 of the cavity-like structure 403 may be small. FIG. 6 is a schematic diagram illustrating a cavity-like structure according to some embodiments of the present disclosure. FIG. 7 is a curve diagram illustrating a sound index of a cavity-like structure including a leakage structure with different sizes according to some embodiments of the present disclosure. As illustrated in FIG. 6, an opening area of the leakage structure of the cavity-like structure may be represented as S, and an area in the cavity-like structure on which is directly acted by the accommodated sound source ("+" shown in FIG. 6) may be represented as $S_0$. The "directly act on" herein may indicate that the sound emitted from the accommodated sound source may perform an acoustic act on the wall surface of the cavity-like structure directly without passing through the leakage structure. A distance between two sound sources may be $d_0$, and a distance between a center of the opening shape of the leakage structure and another sound source ("−" shown in FIG. 6) may be L. As illustrated in FIG. 7, $L/d_0=1.09$ may be kept unchanged, and the greater the relative opening size $S/S_0$ is, the smaller the sound index is. A sound index may be a sound pressure level intensity measured at the sound location. Since the larger the relative opening is, the more sound components emitted from the accommodated sound source to the outside directly, the less the sound reached to the sound location, so that the sound volume may be reduced with the increasing of the relative opening, and the sound index may be reduced. It should be inferred that the larger the opening is, the smaller the sound volume at the sound location is. In some embodiments, to ensure the sound volume at the ear canal when the user wears the open earphone, the overlap ratio of a first projection area of the sound production device 11 on the sagittal plane to a projection area (e.g., an area enclosed by a dotted frame 1015 shown in FIG. 5) of the auricular concha cavity on the sagittal plane may be defined within a specific range to control the opening size. It should be noted that, in the embodiments of the present disclosure, the overlap ratio may be understood as a ratio of an overlap area between the first projection area and the projection area of the auricular concha cavity on the sagittal plane to the projection area of the auricular concha cavity on the sagittal plane.

Figure 8:
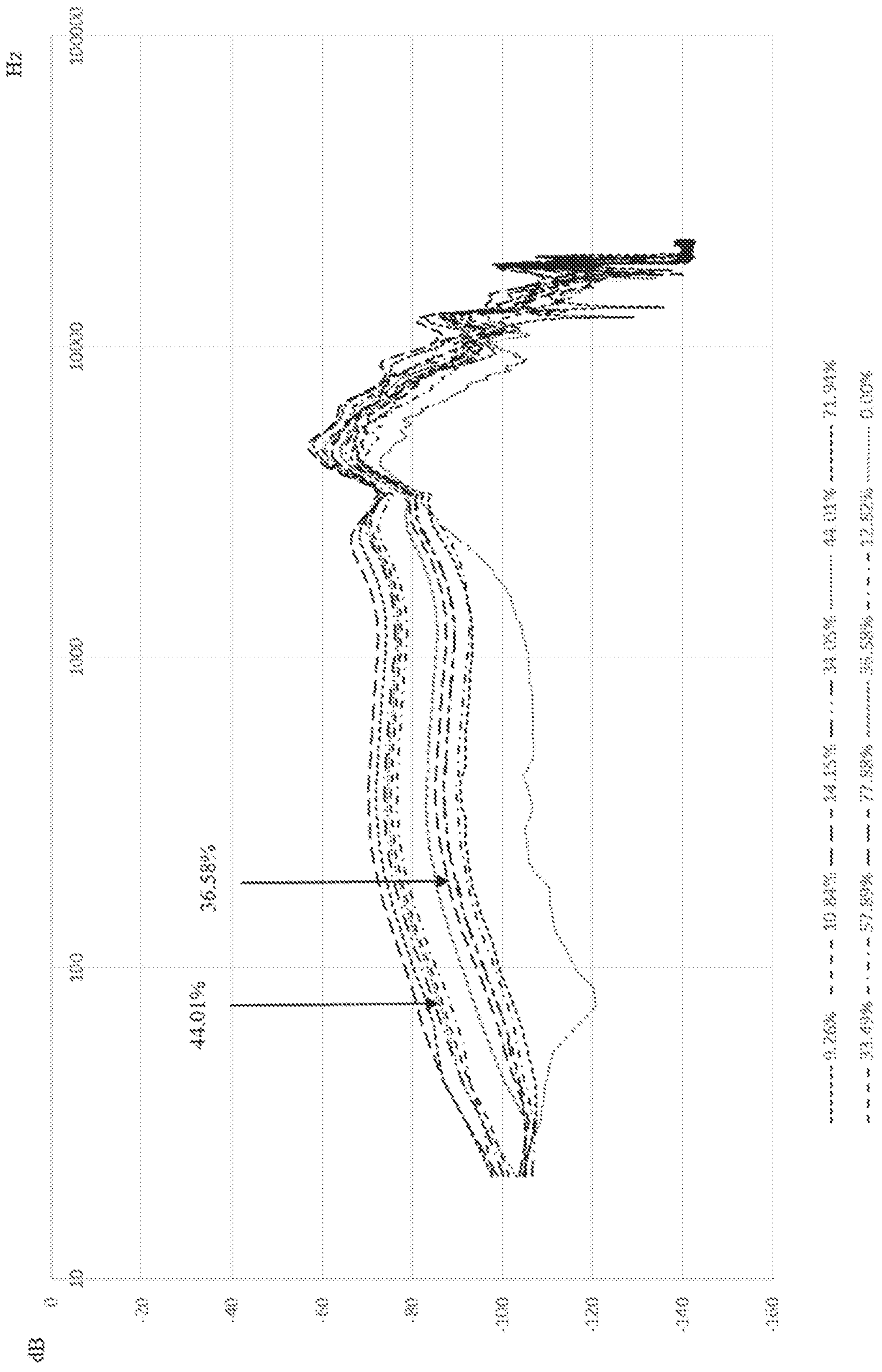
FIG. 8 is a curve diagram illustrating an exemplary frequency response corresponding to different overlap ratios each of which is a ratio of a projection area of a first projection to a projection area of an auricular concha cavity of a user on a sagittal plane according to some embodiments of the present disclosure.

FIG. 8 is a curve diagram illustrating an exemplary frequency response corresponding to different overlap ratios each of which is a ratio of a projection area of a first projection to a projection area of an auricular concha cavity of a user on a sagittal plane according to some embodiments of the present disclosure. As illustrated in FIG. 8, an abscissa may represent a frequency response (unit: Hz), and an ordinate may represent a frequency response (unit: dB) at the earhole corresponding to different overlap ratios. As illustrated in FIG. 8, when the user wears the open earphone, and at least part of the structure of the sound production device 11 covers the auricular concha cavity, that is, the first projection of the sound production device 11 on the sagittal plane has the overlap region with the projection of the auricular concha cavity on the sagittal, the sound volume at the earhole of the user may be increased significantly compared with a condition that the first projection does not have the overlap region (the overlap ratio is 0%) with the projection of the auricular concha cavity on the sagittal plane, especially within the medium and low frequency band range. In some embodiments, to improve the sound effect when the user wears the open earphone, the overlap ratio of the first projection area of the sound production device 11 on the sagittal plane to the projection area of the auricular concha cavity of the user on the sagittal plane may be not less than 9.26%. As illustrated in FIG. 8, with the increasing of the overlap ratio of the first projection area of the sound production device 11 on the sagittal plane to the projection area of the auricular concha cavity of the user on the sagittal plane, an improvement of the sound volume at the earhole of the user may be stronger, especially when the overlap ratio of the first projection area to the projection area of the auricular concha cavity of the user on the sagittal plane is increased from 36.58% to 44.01%, the sound effect may be improved significantly. Accordingly, to further improve the sound effect of the user, the overlap ratio of the first projection area to the projection area of the auricular concha cavity of the user on the sagittal plane may be not less than 44.01%. Alternatively, the overlap ratio of the first projection area to the projection area of the auricular concha cavity of the user on the sagittal plane may be not less than 57.89%. It should be noted that, the frequency response curve obtained through the measurement in the embodiments of the present disclosure corresponding to the overlap ratio of the first projection area to the projection area of the auricular concha cavity of the user on the sagittal plane may be obtained through the measurement of changing a wearing position (e.g., translating along the sagittal axis direction or the vertical axis direction) of the sound production device based on a certain wearing angle (e.g., an angle between an upper sidewall or a lower sidewall and the horizontal direction) of the sound production device and a certain size of the sound production device.

For the open earphone provided by the embodiments of the present disclosure, the sound production device 11 may be well fitted with the auricular concha cavity of the user to form the acoustic model shown in FIG. 4 through the at least part of the sound production device 11 inserted into the auricular concha cavity and controlling the overlap ratio of the first projection area on the sagittal plane to the projection area of the auricular concha cavity of the user on the sagittal plane to be not less than 44.01%, thereby increasing the sound volume at the sound location (e.g., the earhole) of the open earphone, especially the sound volume at the medium and low frequency.

It should also be noted that, to ensure that the earhole of the user is not blocked when the user wears the open earphone 10 to keep an open state of the earhole, so that the user may receive the sound from the outside environment while receiving the sound output by the open earphone 10, the overlap ratio of the first projection area of the sound production device 11 on the sagittal plane to the projection area of the auricular concha cavity of the user on the sagittal plane should not be too large. Under the wearing state, when the overlap ratio of the first projection area of the sound production device 11 on the sagittal plane to the projection area of the auricular concha cavity of the user on the sagittal plane is too small, a size of the sound production device 11 inserted into auricular concha cavity may be too small, and an attachment area between the sound production device 11 and the auricular concha cavity may also be small, so that enough supporting and limiting effect of the auricular concha cavity to the sound production device 11 may be not achieved, which causes a problem that the open earphone 10 may fall off easily due to the wearing instability. On the other hand, a too large gap size between the sound production device 11 and the auricular concha cavity may affect the sound volume at the earhole of the user. Under a premise that the earhole of the user is not blocked by the open earphone, to ensure the stability, the comfortability, and a good sound effect when the user wears the open earphone, in some embodiments, the overlap ratio of the first projection area of the sound production device 11 on the sagittal plane to the projection area of the auricular concha cavity of the user on the sagittal plane may be within a range of 44.01%-77.88%, so that when the whole or part of the structure of the sound production device 11 is inserted into the auricular concha cavity, the sound production device 11 may be supported and limited through an acting force of the auricular concha cavity to the sound production device 11, thereby improving the wearing stability and comfortability. The sound production device 11 and the auricular concha cavity may also form the acoustic model shown in FIG. 4 to ensure the sound volume for the user at the sound location (e.g., the earhole) and reduce the far-field sound leakage volume. Preferably, the overlap ratio of the first projection area of the sound production device 11 on the sagittal plane to the projection area of the auricular concha cavity of the user on the sagittal plane may be within a range of 46%-71.94%. Preferably, the overlap ratio of the first projection area of the sound production device 11 on the sagittal plane to the projection area of the auricular concha cavity of the user on the sagittal plane may be within a range of 48%-65%. Preferably, the overlap ratio of the first projection area of the sound production device 11 on the sagittal plane to the projection area of the auricular concha cavity of the user on the sagittal plane may be within a range of 57.89%-62%.

A size and a contour shape of the auricular concha cavity of different users (e.g., different ages, different genders, and different heights and weights) may be different, and the projection area of the auricular concha cavity of different users on the sagittal plane may be within a certain range (e.g., 320 $mm^2$-410 $mm^2$). As illustrated above, the overlap ratio of the first projection area of the sound production device 11 on the sagittal plane to the projection area of the auricular concha cavity of the user on the sagittal plane should not be too large or too small. Correspondingly, a whole size (especially a size along the long axis direction and the short axis direction) of the sound production device 11 should also not be too large or too small. For example, if the projection area of the sound production device 11 on the sagittal plane is too small, the sound production device 11 may be not able to cover the auricular concha cavity completely, and the gap size formed between the sound production device 11 and the auricular concha cavity may be greater, so that the sound volume at the earhole of the user may be lower. If the projection area of the sound production device 11 on the sagittal plane is too large, the sound production device 11 may cover the earhole of the user, so that the earhole cannot be kept in an open state, thereby affecting the user to receive the sound from the outer environment. To ensure the sound effect when the user wears the open earphone and receive the sound from the outer environment by keeping the earhole in the open state, in some embodiments, the first projection area of the sound production device 11 on the sagittal plane may be within a range of 202 $mm^2$-560 $mm^2$. Preferably, the first projection area of the sound production device 11 on the sagittal plane may be within a range of 220 $mm^2$-500 $mm^2$. Preferably, the first projection area of the sound production device 11 on the sagittal plane may be within a range of 300 $mm^2$-470 $mm^2$. Preferably, the first projection area of the sound production device 11 on the sagittal plane may be within a range of 330 $mm^2$-440 $mm^2$.

As illustrated in FIG. 5, the first projection shape of the sound production device 11 on the sagittal plane may include the long axis direction Y and the short axis direction Z. In some embodiments, considering that when the size of the sound production device 11 along the long axis direction Y and the short axis direction Z is too small, the volume of the sound production device 11 may be small relatively, and an area of the vibration diaphragm arranged in the sound production device 11 may also be small relatively, which causes a low efficiency of generating the sound by driving the air in the housing of the sound production device 11 through the vibration diaphragm, thereby affecting an acoustic output effect of the open earphone. In addition, when the size of the sound production device 11 along the long axis direction Y and the short axis direction Z is too large, the sound production device 11 may beyond a range of the auricular concha cavity, which is not able to be inserted into the auricular concha cavity and form the cavity-like structure, or the gap size formed between the sound production device 11 and the auricular concha cavity may be too large, which affects the sound volume at the earhole when the user wears the open earphone 10 and the far-field sound leakage effect. When the size of the sound production device 11 along the short axis direction Z is too large, the sound production device 11 may cover the earhole of the user to affect the user receiving the sound from the outer environment. In some embodiments, to ensure a good acoustic output quality when the user wears the open earphone 10, a size of the first projection shape along the long axis direction Y may be within a range of 12 mm-32 mm. Preferably, the size of the first projection shape along the long axis direction Y may be within a range of 18 mm-29 mm. Preferably, the size of the first projection shape along the long axis direction Y may be within a range of 20 mm-27 mm. Preferably, the size of the first projection shape along the long axis direction Y may be within a range of 22 mm-25 mm. Correspondingly, the size of the first projection shape along the short axis direction Z may be within a range of 4.5 mm-18 mm. Preferably, the size of the first projection shape along the short axis direction Z may be within a range of 10 mm-15 mm. Preferably, the size of the first projection shape along the short axis direction Z may be within a range of 11 mm-13.5 mm. Preferably, the size of the first projection shape along the short axis direction Z may be within a range of 12 mm-13 mm. To further illustrate the effect of the first projection shape of the sound production device 11 on the sagittal plane on the sound performance when the user wears the open earphone, the following may be an exemplary illustration of a ratio of the size of the first projection shape of the sound production device 11 on the sagittal plane along the long axis direction Y to the size of the first projection shape of the sound production device 11 on the sagittal plane along the short axis direction Z.

Figure 9:
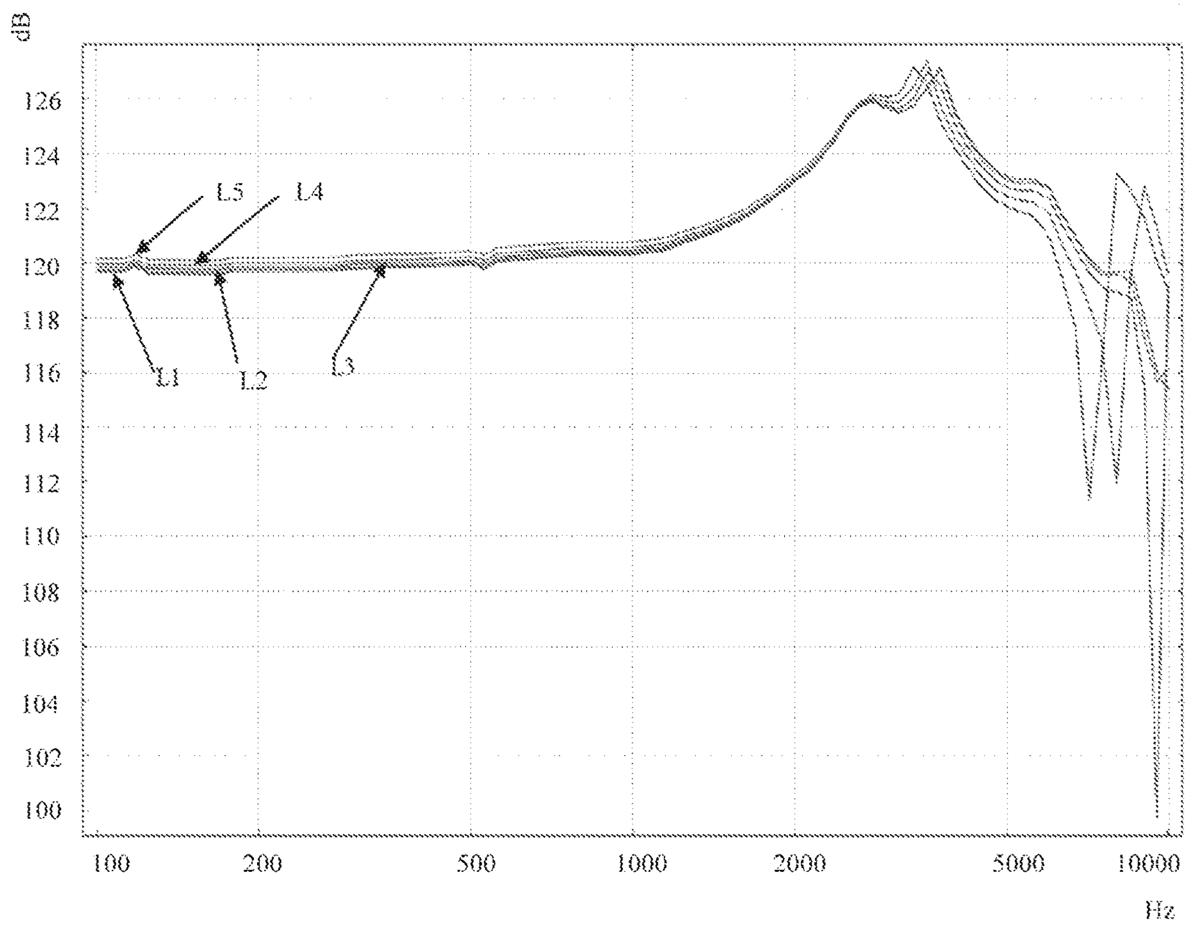
FIG. 9 is a curve diagram illustrating an exemplary frequency response corresponding to different ratios each of which is a ratio of a size of a first projection along a long axis direction to a size of a first projection along a short axis direction according to some embodiments of the present disclosure.

FIG. 9 is a curve diagram illustrating an exemplary frequency response corresponding to different ratios each of which is a ratio of a size of a first projection along a long axis direction to a size of a first projection along a short axis direction according to some embodiments of the present disclosure. As illustrated in FIG. 9, an abscissa may represent a frequency (unit: Hz), and an ordinate may represent a total sound pressure level (unit: dB) corresponding to different ratios of the size of the first projection shape of the sound production device 11 on the sagittal plane along the long axis direction Y to the size of the first projection shape along the short axis direction Z. For a convenience of distinguishing different frequency response curves, frequency response curves shown in FIG. 9 from upper to the lower may correspond to L5, L4, L3, L2, and L1, respectively. L1 may be the frequency response curve when the ratio of the size of the first projection shape along the long axis direction Y to the size of the first projection shape along the short axis direction Z is 4.99 (That is, the size of the first projection shape along the long axis direction Y is 24.93 mm, and the size of the first projection shape along the short axis direction Z is 4.99 mm). L2 may be the frequency response curve when the ratio of the size of the first projection shape along the long axis direction Y to the size of the first projection shape along the short axis direction Z is 3.99 (That is, the size of the first projection shape along the long axis direction Y is 22.43 mm, and the size of the first projection shape along the short axis direction Z is 5.61 mm). L3 may be the frequency response curve when the ratio of the size of the first projection shape along the long axis direction Y to the size of the first projection shape along the short axis direction Z is 3.04 (That is, the size of the first projection shape along the long axis direction Y is 19.61 mm, and the size of the first projection shape along the short axis direction Z is 6.54 mm). L4 may be the frequency response curve when the ratio of the size of the first projection shape along the long axis direction Y to the size of the first projection shape along the short axis direction Z is substantially 2.0 (That is, the size of the first projection shape along the long axis direction Y is 16.33 mm, and the size of the first projection shape along the short axis direction Z is 8.16 mm). L5 may be the frequency response curve when the ratio of the size of the first projection shape along the long axis direction Y to the size of the first projection shape along the short axis direction Z is 1.0 (That is, the size of the first projection shape along the long axis direction Y is 12.31 mm, and the size of the first projection shape along the short axis direction Z is 12.31 mm). As illustrated in FIG. 9, resonance frequencies corresponding to the frequency response curves L1-L5 may be substantially the same (about 3500 Hz). However, when the ratio of the size of the first projection shape along the long axis direction Y to the size of the first projection shape along the short axis direction Z is within a range of 1.0-3.0, the frequency response curve of the sound production device 11 may be generally smooth, and the frequency response may be good within a range of 100 Hz-3500 Hz. When the frequency is 5000 Hz, the greater the ratio of the size of the first projection shape along the long axis direction Y to the size of the first projection shape along the short axis direction Z is, the faster the sound frequency response of the sound production device 11 decreases at the earhole. Accordingly, in some embodiments, to ensure a good acoustic output effect when the user wears the open earphone, the ratio of the size of the first projection shape of the sound production device 11 on the sagittal plane along the long axis direction Y to the size of the first projection shape of the sound production device 11 on the sagittal plane along the short axis direction Z may be within a range of 1.0-3.0. In some embodiments, considering a certain first projection area, the smaller the ratio of the size of the first projection shape of the sound production device 11 on the sagittal plane along the long axis direction Y to the size of the first projection shape of the sound production device 11 on the sagittal plane along the short axis direction Z is, the greater the size of the first projection shape of the sound production device 11 on the sagittal plane along the short axis direction Z. Since a too large size of the first projection shape of the sound production device 11 on the sagittal plane along the short axis direction Z may cause the sound production device 11 to be unable to be well inserted into the auricular concha cavity of the user, thereby causing a problem of wearing stability and comfortability, thus, to ensure the wearing stability and comfortability, the ratio of the size of the first projection shape of the sound production device 11 on the sagittal plane along the long axis direction Y to the size of the first projection shape of the sound production device 11 on the sagittal plane along the short axis direction Z may be within a range of 1.4-2.5. Preferably, the ratio of the size of the first projection shape of the sound production device 11 on the sagittal plane along the long axis direction Y to the size of the first projection shape of the sound production device 11 on the sagittal plane along the short axis direction Z may be within a range of 1.4-2.3. Preferably, the ratio of the size of the first projection shape of the sound production device 11 on the sagittal plane along the long axis direction Y to the size of the first projection shape of the sound production device 11 on the sagittal plane along the short axis direction Z may be within a range of 1.45-2.0. It should be understood that, when the sound production device 11 includes different ratios of a length to a width, the overlap ratio of the first projection of the sound production device 11 on the sagittal plane to the projection of the auricular concha cavity on the sagittal plane may be different. In some embodiments, when the ratio of the size of the first projection shape of the sound production device 11 on the sagittal plane along the long axis direction Y to the size of the first projection shape of the sound production device 11 on the sagittal plane along the short axis direction Z is within a range of 1.4-3, the projection area of the sound production device 11 in a normal wearing state projected on the sagittal plane may be relatively more suitable, which not only avoiding a greater gap size between the sound production device 11 and the auricular concha cavity caused by a too small projection area of the sound production device 11 on the sagittal plane, thereby causing a lower sound volume at the earhole of the user, but also avoiding unable to keep the earhole of the user in the open state caused by a too large projection area of the sound production device 11 on the sagittal plane, thereby affecting the user to receive the sound from the outer environment and enabling a good acoustic experience of the user.

It should be noted that, the frequency response curves obtained through the measurement shown in FIG. 9 may be obtained through a simulation experiment. An auditory system of the human body may be simulated through the P.574.3 type of a full-band human ear simulation model, and a human auricle may be simulated through an auricle defined based on the ITU-TP.57 standard. The auricle of the ITU-TP.57 standard may include a geometric shape of the ear canal. In addition, the frequency response curves corresponding to different sizes of the long axis direction and different sizes of the short axis direction obtained through the measurement in the embodiments of the present disclosure may be obtained through the measurement by changing the different sizes along the long axis direction and the different sizes along the short axis direction based on a certain wearing angle and wearing position of the sound production device.

In some embodiments, the size of the sound production device 11 along the thickness direction X may also affect the sound effect when the user wears the open earphone. A further illustration may be provided below combined with FIG. 10.

Figure 10:
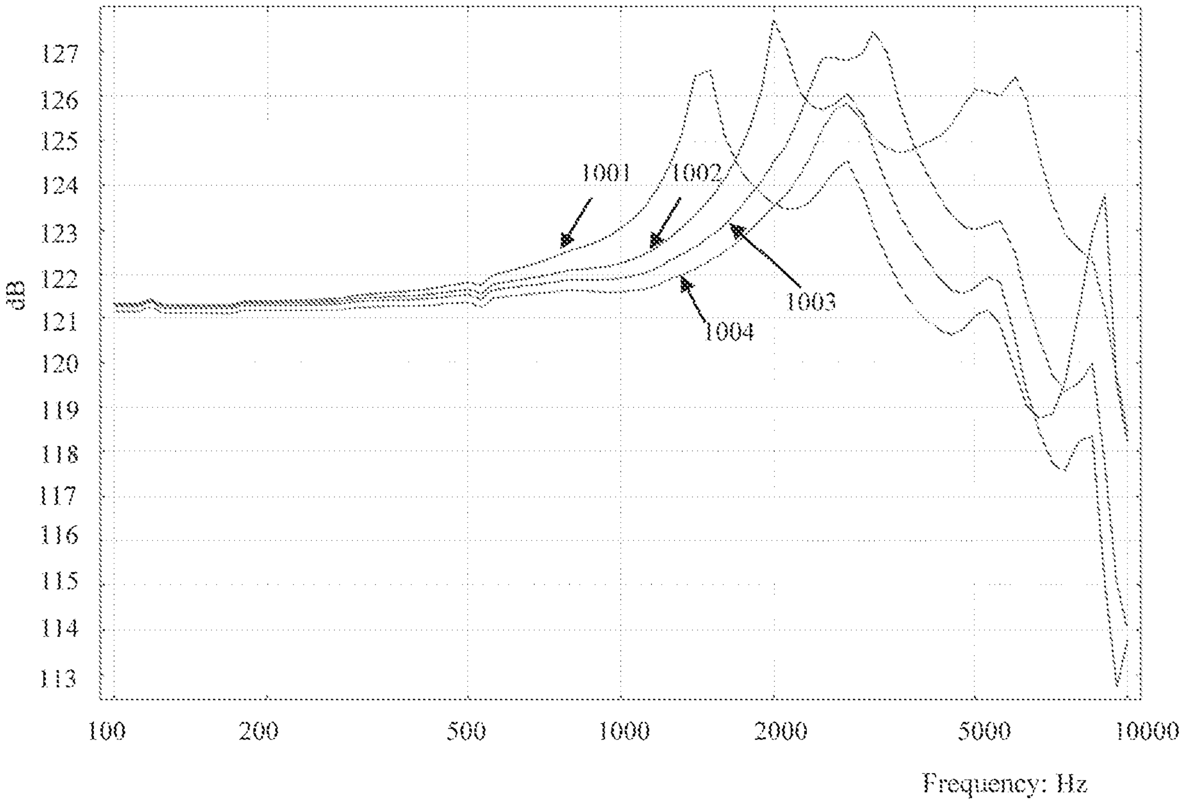
FIG. 10 is a curve diagram illustrating an exemplary frequency response corresponding to different sizes of a sound production device along a thickness direction according to some embodiments of the present disclosure.

FIG. 10 is a curve diagram illustrating an exemplary frequency response corresponding to different sizes of a sound production device along a thickness direction according to some embodiments of the present disclosure. As illustrated in FIG. 10, an abscissa may represent a frequency (unit: Hz), and an ordinate may represent a sound pressure level (unit: dB) corresponding to different frequencies at the earhole. A frequency response curve 1001 may be a frequency response curve when the size of the sound production device 11 along the thickness direction X is 20 mm. A frequency response curve 1002 may be a frequency response curve when the size of the sound production device 11 along the thickness direction X is 10 mm. A frequency response curve 1003 may be a frequency response curve when the size of the sound production device 11 along the thickness direction X is 5 mm. A frequency response curve 1004 may be a frequency response curve when the size of the sound production device 11 along the thickness direction X is 1 mm. The size (also referred to as the thickness) of the sound production device 11 along the thickness direction X may be proportional to the size of the front chamber of the sound production device 11 along the thickness direction X. The smaller the size of the front chamber along the thickness direction X is, the greater the resonance frequency corresponding to a resonant peak of the front chamber is, and the frequency response curve within a lower frequency band range (100 Hz-1000 Hz) may be smoother. In some embodiments, the sound hole(s) may be acoustic coupled to the front chamber, and the sound in the front chamber may be transmitted to the earhole of the user through the sound hole(s) and received by the auditory system of the user. If the size of the sound production device 11 along the thickness direction X is too large, and the resonance frequency corresponding to the resonant peak of the front chamber corresponding to the sound production device 11 is too small, the acoustic performance of the sound production device 11 may be affected within the lower frequency band. In addition, under the wearing state, a larger whole size or weight of the sound production device 11 may affect the wearing stability and comfortability. When the size of the sound production device 11 along the thickness direction X is too small, a space of the front chamber and the rear chamber of the sound production device 11 may be limited to affect a vibration amplitude of the vibration diaphragm, so that the output of the sound production device 11 at a lower frequency may be restricted. Accordingly, to ensure a good acoustic output effect and the wearing stability of the sound production device 11, in some embodiments, the thickness (the size of the sound production device 11 along the thickness direction) of the sound production device 11 may be within in range of 2 mm-20 mm. Preferably, the thickness of the sound production device 11 may be within in range of 5 mm-15 mm. Preferably, the thickness of the sound production device 11 may be within in range of 8 mm-12 mm. It should be noted that, under the wearing state, when at least one wall surface of two sidewalls (i.e., an inner sidewall facing outside of the ear of the user and an outer sidewall deviated from outside of the ear of the user) of the sound production device 11 opposite to each other that are arranged along the thickness direction X is a non-planar surface, the thickness of the sound production device 11 may be a maximum distance between the inner sidewall and the outer sidewall along the thickness direction X.

It should be noted that, the frequency response curves corresponding to different thickness obtained through the measurement in the embodiments of the present disclosure may be obtained through the measurement by changing the size of the sound production device along the thickness direction based on a certain wearing angle (an angle between the upper sidewall or the lower sidewall and the horizontal direction), wearing position, a certain size along the long axis direction, and a certain size along the short axis direction.

Figure 11A:
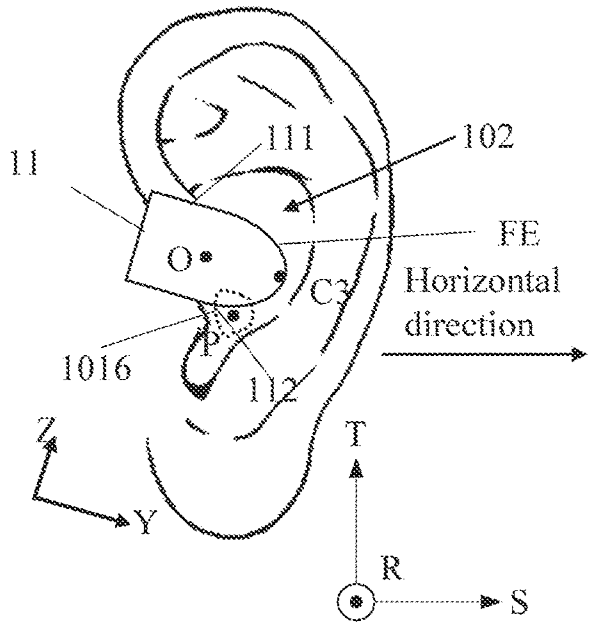
FIG. 11A is a schematic diagram illustrating an exemplary fitting position between an open earphone and an ear canal of a user according to some embodiments of the present disclosure.
Figure 11B:
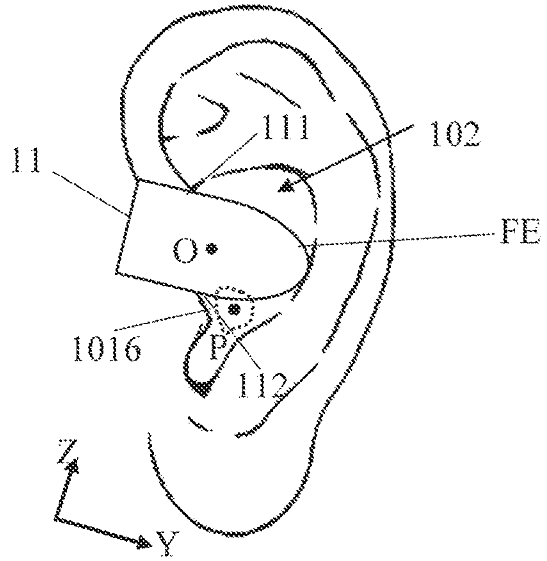
FIG. 11B is a schematic diagram illustrating an exemplary fitting position between an open earphone and an ear canal of a user according to some embodiments of the present disclosure.
Figure 11C:
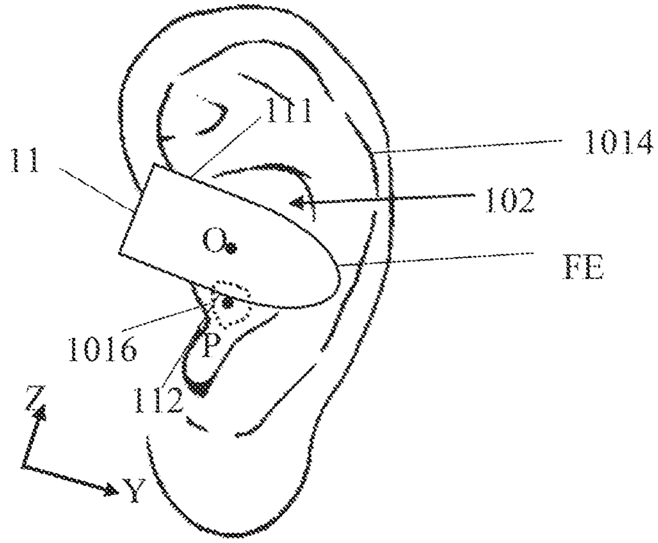
FIG. 11C is a schematic diagram illustrating an exemplary fitting position between an open earphone and an ear canal of a user according to some embodiments of the present disclosure.

FIGS. 11A-11C are schematic diagrams illustrating exemplary fitting positions between an open earphone and an ear canal of a user according to some embodiments of the present disclosure.

The gap size formed between the sound production device 11 and an edge of the auricular concha cavity may not only be related to the angle between an upper sidewall 111 (also referred to as an upper side surface) projection or a lower sidewall 112 (also referred to as a lower side surface) projection of the sound production device 11 on the sagittal plane and the horizontal direction (parallel to the sagittal axis S with a same direction), and the size of (e.g., a size along the short axis direction Z and the long axis direction Y shown in FIG. 11A, and a size along the thickness direction X shown in FIG. 3) the sound production device 11, but also related to a distance of the end FE of the sound production device 11 relative to the edge of the auricular concha cavity. The distance of the end FE of the sound production device 11 relative to the edge of the auricular concha cavity may be represented as a distance between a midpoint of the projection of the end FE of the sound production device 11 on the sagittal plane and the projection of the edge of the auricular concha cavity on the sagittal plane. The auricular concha cavity may be a recess region under the crus of helix. That is, the edge of the auricular concha cavity may at least be composed of a sidewall under the crus of helix, a contour of the tragus, the intertragal notch, the antitragic apex, the incisura antitragus helicine, and a contour of the antihelix corresponding to the auricular concha cavity. The projection of the edge of the auricular concha cavity on the sagittal plane may be the projection contour of the auricular concha cavity on the sagittal plane. Specifically, one end of the sound production device 11 may be connected to the suspension structure 12 (the second part 122 of the ear hook). Under the wearing state, the whole or part of the structure of the sound production device 11 may be inserted into the auricular concha cavity, and the distance of the end FE (free end) of the sound production device 11 relative to the edge of the auricular concha cavity may affect the overlap ratio of the first projection area of the sound production device 11 on the sagittal plane to the projection area of the auricular concha cavity of the user on the sagittal plane, thereby affecting the gap size between the sound production device 11 and the auricular concha cavity and the sound volume at the earhole of the user. Furthermore, the midpoint of the projection of the end FE of the sound production device 11 on the sagittal plane and the projection of the edge of the auricular concha cavity on the sagittal plane may represent a position of the end FE of the sound production device 11 relative to the auricular concha cavity and a cover level of the sound production device 11 to the auricular concha cavity of the user. It should be noted that, when the projection of the end FE of the sound production device 11 on the sagittal plane is a curve or broken line, the midpoint of the projection of the end FE of the sound production device 11 on the sagittal plane may be selected through the following exemplary methods: a line segment may be determined through two points with a maximum distance of the projection of the end FE of the sound production device 11 on the sagittal plane along the short axis direction, a vertical centerline may be determined through a midpoint on the line segment, and an intersecting point between the vertical centerline and the projection may be determined as the midpoint of the projection of the end FE of the sound production device 11 on the sagittal plane. In some embodiments, when the end FE of the sound production device 11 is a curved surface, a tangent point on a tangent line of the projection that is parallel to the short axis direction Z may be determined as the midpoint of the projection of the end FE of the sound production device 11 on the sagittal plane.

As illustrated in FIG. 11A, when the sound production device 11 does not abut against the edge of the auricular concha cavity 102, the end FE of the sound production device 11 may be located in the auricular concha cavity 102. That is, the midpoint of the projection of the end FE of the sound production device 11 on the sagittal plane may not overlap with the projection of the edge of the auricular concha cavity 102 on the sagittal plane. As illustrated in FIG. 11B, the sound production device 11 of the open earphone 10 may be inserted into the auricular concha cavity 102, and the end FE of the sound production device 11 may abut against the edge of the auricular concha cavity 102. That is, the midpoint of the projection of the end FE of the sound production device 11 on the sagittal plane may overlap with the projection of the edge of the auricular concha cavity 102 on the sagittal plane. As illustrated in FIG. 11C, the sound production device 11 of the open earphone 10 may cover the auricular concha cavity, and the end FE of the sound production device 11 may be located between the edge of the auricular concha cavity 102 and an inner contour 1014 of the auricle.

As illustrated in FIGS. 11A-11C, when the end FE of the sound production device 11 is located in the edge of the auricular concha cavity 102, if the distance between a midpoint C3 of the projection of the end FE of the sound production device 11 on the sagittal plane and the projection of the edge of the auricular concha cavity 102 on the sagittal plane is too large, the overlap ratio of the first projection area of the sound production device 11 on the sagittal plane to the projection area of the auricular concha cavity on the sagittal plane may be too small, and the gap size of the gap formed between the sound production device 11 and the auricular concha cavity 102 may be greater, so that the sound volume at the earhole of the user may be affected. When the midpoint C3 of the projection of the end FE of the sound production device 11 on the sagittal plane is located at a position between the projection of the edge of the auricular concha cavity 102 on the sagittal plane and the projection of the inner contour 1014 of the auricle on the sagittal plane, the midpoint C3 of the projection of the end FE of the sound production device 11 on the sagittal plane and the projection of the edge of the auricular concha cavity 102 on the sagittal plane may be too large, the end FE of the sound production device 11 may be interfered with the auricle, and a cover ratio of the sound production device 11 to the auricular concha cavity 102 may be not increased. In addition, if the end FE of the sound production device 11 is not located in the auricular concha cavity 102, the edge of the auricular concha cavity 102 may be not able to limit the sound production device 11, so that the sound production device 11 may easily fall off. In addition, the increased size of the sound production device 11 may increase the weight of the sound production device 11, so that the wearing comfortability and the convenience of carry-on of the user may be affected. It should be noted that, when the projection of the end FE of the sound production device 11 on the sagittal plane is a curve or broken line, the midpoint of the projection of the end FE of the sound production device 11 on the sagittal plane may be selected through the following exemplary methods: a line segment may be determined through a start point and an end point of the projection of the end FE of the sound production device 11 on the sagittal plane, a vertical centerline may be determined through a midpoint on the line segment, and an intersecting point between the vertical centerline and the projection may be determined as the midpoint of the projection of the end FE of the sound production device 11 on the sagittal plane. In some embodiments, when the end FE of the sound production device 11 is a curved surface, a tangent point on a tangent line of the projection that is parallel to the short axis direction Z may be determined as the midpoint of the projection of the end FE of the sound production device 11 on the sagittal plane.

Figure 12:
FIG. 12 is a curve diagram illustrating an exemplary frequency response corresponding to different distances between a projection of an end of a sound production device on a sagittal plane and a projection of an edge of an auricular concha cavity on the sagittal plane according to some embodiments of the present disclosure.

FIG. 12 is a curve diagram illustrating an exemplary frequency response corresponding to different distances between a projection of an end of a sound production device on a sagittal plane and a projection of an edge of an auricular concha cavity on the sagittal plane according to some embodiments of the present disclosure. As illustrated in FIG. 12, an abscissa may represent a frequency response (unit: Hz), and an ordinate may represent a sound pressure level (unit: dB) at the earhole corresponding to different frequencies. A frequency response curve 1201 may be the frequency response curve when the distance between the midpoint C3 of the projection of the end of the sound production device on the sagittal plane and the projection of the edge of the auricular concha cavity on the sagittal plane is 0 mm (e.g., under the wearing state, the end of the sound production device 11 abuts against the edge of the auricular concha cavity). A frequency response curve 1202 may be the frequency response curve when the distance between the midpoint C3 of the projection of the end of the sound production device on the sagittal plane and the projection of the edge of the auricular concha cavity on the sagittal plane is 4.77 mm. A frequency response curve 1203 may be the frequency response curve when the distance between the midpoint C3 of the projection of the end of the sound production device on the sagittal plane and the projection of the edge of the auricular concha cavity on the sagittal plane is 7.25 mm. A frequency response curve 1204 may be the frequency response curve when the distance between the midpoint C3 of the projection of the end of the sound production device on the sagittal plane and the projection of the edge of the auricular concha cavity on the sagittal plane is 10.48 mm. A frequency response curve 1205 may be the frequency response curve when the distance between the midpoint C3 of the projection of the end of the sound production device on the sagittal plane and the projection of the edge of the auricular concha cavity on the sagittal plane is 15.3 mm. A frequency response curve 1206 may be the frequency response curve when the distance between the midpoint C3 of the projection of the end of the sound production device on the sagittal plane and the projection of the edge of the auricular concha cavity on the sagittal plane is 19.24 mm. As illustrated in FIG. 12, when the distance between the midpoint C3 of the projection of the end of the sound production device on the sagittal plane and the projection of the edge of the auricular concha cavity on the sagittal plane is 0 mm (e.g., under the wearing state, the end of the sound production device 11 abuts against the edge of the auricular concha cavity), 4.77 mm, and 7.25 mm, the sound pressure level at the earhole obtained through the measurement may be greater. When the distance between the midpoint C3 of the projection of the end of the sound production device on the sagittal plane and the projection of the edge of the auricular concha cavity on the sagittal plane is 19.24 mm (e.g., under the wearing state, the end of the sound production device 11 abuts against the edge of the auricular concha cavity), the sound pressure level at the earhole obtained through the measurement may be smaller. That is, under the wearing state, the greater the distance between the midpoint C3 of the projection of the end of the sound production device on the sagittal plane and the projection of the edge of the auricular concha cavity on the sagittal plane, that is, the less the structure of the sound production device 11 inserted into the auricular concha cavity, the smaller the overlap ratio of the first projection area of the sound production device 11 on the sagittal plane to the projection area of the auricular concha cavity of the user on the sagittal plane is, and the worse the sound volume at the earhole is. Accordingly, to ensure a good sound effect of the open earphone 10 and the wearing comfortability and stability of the user, in some embodiments, the distance between the midpoint C3 of the projection of the end FE of the sound production device 11 on the sagittal plane and the projection of the edge of the auricular concha cavity on the sagittal plane may be not greater than 16 mm. Preferably, the distance between the midpoint C3 of the projection of the end FE of the sound production device 11 on the sagittal plane and the projection of the edge of the auricular concha cavity on the sagittal plane may be not greater than 13 mm. Preferably, the distance between the midpoint C3 of the projection of the end FE of the sound production device 11 on the sagittal plane and the projection of the edge of the auricular concha cavity on the sagittal plane may be within a range of 0 mm-10.92 mm. Preferably, the distance between the midpoint C3 of the projection of the end FE of the sound production device 11 on the sagittal plane and the projection of the edge of the auricular concha cavity on the sagittal plane may be within a range of 0 mm-15.3 mm. Preferably, the distance between the midpoint C3 of the projection of the end FE of the sound production device 11 on the sagittal plane and the projection of the edge of the auricular concha cavity on the sagittal plane may be within a range of 0 mm-10.48 mm. Preferably, the distance between the midpoint C3 of the projection of the end FE of the sound production device 11 on the sagittal plane and the projection of the edge of the auricular concha cavity on the sagittal plane may be within a range of 0 mm-7.25 mm. Preferably, the distance between the midpoint C3 of the projection of the end FE of the sound production device 11 on the sagittal plane and the projection of the edge of the auricular concha cavity on the sagittal plane may be within a range of 0 mm-4.77 mm. In some embodiments, the end of the sound production device may abut against the edge of the auricular concha cavity, which may be understood as the projection of the end FE of the sound production device 11 may overlap (e.g., a position of the sound production device 11 relative to the auricular concha cavity shown in FIG. 11A) with the projection of the edge of the auricular concha cavity on the sagittal plane herein. That is, when the distance between the midpoint C3 of the projection of the end of the sound production device on the sagittal plane and the projection of the edge of the auricular concha cavity on the sagittal plane is 0 mm, the sound production device 11 may have a good frequency response. The end of the sound production device 11 may abut against the edge of the auricular concha cavity, so that the sound production device 11 may be supported and limited to improve the stability when the user wears the open earphone. It should be noted that, the distance between the midpoint C3 of the projection of the end of the sound production device 11 on the sagittal plane and the projection of the edge of the auricular concha cavity 102 on the sagittal plane may be a minimum distance between the midpoint C3 of the projection of the end of the sound production device 11 on the sagittal plane and the projection of the edge of the auricular concha cavity 102 on the sagittal plane. In some embodiments, the distance between the midpoint C3 of the projection of the end of the sound production device 11 on the sagittal plane and the projection of the edge of the auricular concha cavity 102 on the sagittal plane may be a distance along the sagittal axis direction. In addition, the distance between the end of the sound production device 11 on the sagittal plane and the edge of the auricular concha cavity on the sagittal plane involved in the FIG. 12 may be obtained through the measurement based on the scenario that the end of the sound production device 11 is inserted into the auricular concha cavity. It should be noted that, in a specific wearing scenario, another point of the projection of the end FE of the sound production device 11 on the sagittal plane except for the midpoint C3 may also abut against the edge of the auricular concha cavity. At this time, the distance between the midpoint C3 of the projection of the end of the sound production device 11 on the sagittal plane and the projection of the edge of the auricular concha cavity on the sagittal plane may be greater than 0 mm. In some embodiments, the distance between the midpoint C3 of the projection of the end of the sound production device 11 on the sagittal plane and the projection of the edge of the auricular concha cavity on the sagittal plane may be 2 mm-16 mm. Preferably, the distance between the midpoint C3 of the projection of the end of the sound production device 11 on the sagittal plane and the projection of the edge of the auricular concha cavity on the sagittal plane may be 4 mm-10.48 mm. In addition, the auricular concha cavity 102 may be in a form of a recess structure, and a sidewall corresponding to the auricular concha cavity 102 may be not a smooth wide surface. The projection of the edge of the auricular concha cavity on the sagittal plane may be an irregular two-dimensional shape, and a projection of the sidewall corresponding to the auricular concha cavity 102 on the sagittal plane may be located at a contour of the shape, or located outside of the contour of the shape. Therefore, the midpoint of the projection of the end FE of the sound production device 11 on the sagittal plane may also not overlap with the projection of the edge of the auricular concha cavity 102 on the sagittal plane. For example, the midpoint of the projection of the end FE of the sound production device 11 on the sagittal plane may be located at an inner side or outer side of the projection of the edge of the auricular concha cavity 102 on the sagittal plane. In the embodiments of the present disclosure, when the end FE of the sound production device 11 is located in the auricular concha cavity 102, the distance between the midpoint of the projection of the end FE of the sound production device 11 on the sagittal plane and the projection of the edge of the auricular concha cavity 102 on the sagittal plane may be within a specific range (e.g., not greater than 6 mm), which indicates that the end FE of the sound production device 11 abuts against the edge of the auricular concha cavity 102.

It should be noted that the frequency response curves corresponding to different distances between the midpoint of the projection of the end FE of the sound production device on the sagittal plane and the projection of the edge of the auricular concha cavity on the sagittal plane obtained through the measurement in the embodiments of the present disclosure may be obtained through the measurement by changing the wearing position (e.g., along the sagittal axis direction) of the sound production device based on a certain wearing angle (an angle between the upper sidewall or the lower sidewall and the horizontal direction), a certain size along the long axis direction, a certain size along the short axis direction, and a certain size along the thickness direction.

In some embodiments, as illustrated in FIG. 11A to FIG. 11C, when the open earphone 10 is in the wearing state, the first projection of the sound production device 11 on the sagittal plane may at least partially overlap with a projection (e.g., the region 1016 enclosed by the dotted line shown in FIGS. 11A-11C) of the earhole on the sagittal plane. A distance between a centroid O of the first projection of the sound production device 11 on the sagittal plane and a centroid P of the projection of the earhole on the sagittal plane may represent a relative position relationship between the sound production device 111 and the earhole, and an overlap ratio of the first projection area of the sound production device 11 on the sagittal plane to the projection area of the earhole on the sagittal plane. The overlap ratio may affect a count of leakage structures of the cavity-like structure formed by the sound production device 11 and the ear of the user and the opening size of the leakage structure. The opening size of the leakage structure may affect the sound quality directly. Specifically, the larger the opening of the leakage structure, the more sound components emitted from the sound production device 11 to the outside directly, and the less the sound reached the sound location.

Figure 13A:
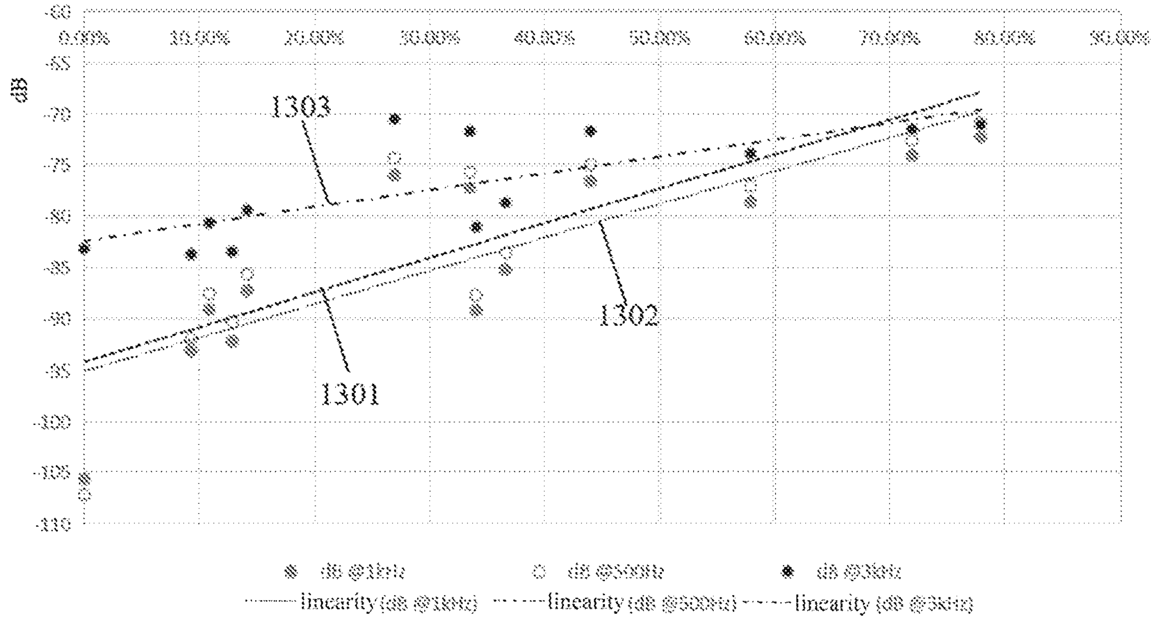
FIG. 13A is a curve diagram illustrating an exemplary frequency response corresponding to different distances between a centroid of a first projection and a centroid of a projection of an earhole on a sagittal plane according to some embodiments of the present disclosure.
Figure 13B:
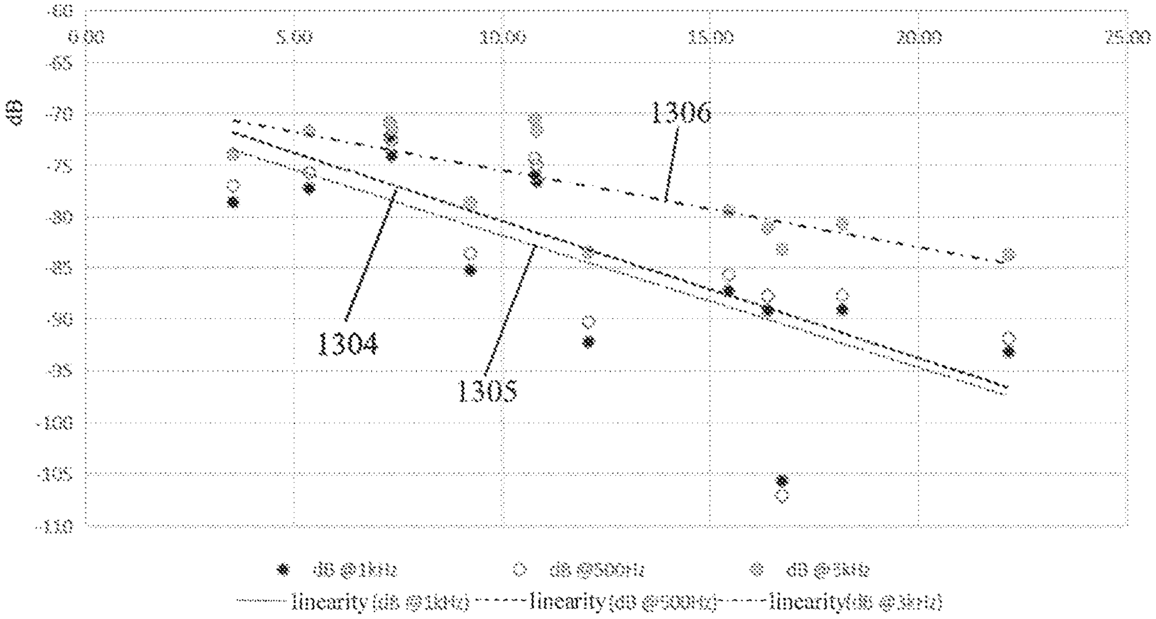
FIG. 13B is a curve diagram illustrating an exemplary frequency response corresponding to different overlap ratios each of which is a ratio of a projection area of a first projection to a projection area of an auricular concha cavity of a user on a sagittal plane according to some embodiments of the present disclosure.

FIG. 13A is a curve diagram illustrating an exemplary frequency response corresponding to different distances between a centroid of a first projection and a centroid of a projection of an earhole on a sagittal plane according to some embodiments of the present disclosure. FIG. 13B is a curve diagram illustrating an exemplary frequency response corresponding to different overlap ratios each of which is a ratio of a projection area of a first projection to a projection area of an auricular concha cavity of a user on a sagittal plane according to some embodiments of the present disclosure.

As illustrated in FIG. 13A, an abscissa may represent an overlap ratio of the first projection area of the sound production device 11 on the sagittal plane to the projection area of the auricular concha cavity on the sagittal plane, and an ordinate may represent a sound pressure level at the earhole corresponding to different overlap ratios. A straight line 1301 may represent a linear relationship fitted with the sound pressure level at the earhole according to the overlap ratio of the first projection area to the projection area of the auricular concha cavity on the sagittal plane when the frequency is 500 Hz. A straight line 1302 may represent a linear relationship fitted with the sound pressure level at the earhole according to the overlap ratio of the first projection area to the projection area of the auricular concha cavity on the sagittal plane when the frequency is 1 kHz. A straight line 1303 may represent a linear relationship fitted with the sound pressure level at the earhole according to the overlap ratio of the first projection area to the projection area of the auricular concha cavity on the sagittal plane when the frequency is 3 kHz. A hollow circular point shown in FIG.

13A may be test data corresponding to different overlap ratios of the first projection area to the projection area of the auricular concha cavity on the sagittal plane when the frequency is 500 Hz. A circular point with a smaller gray value shown in FIG. 13A may be test data corresponding to different overlap ratios of the first projection area to the projection area of the auricular concha cavity on the sagittal plane when the frequency is 1 kHz. A black circular point shown in FIG. 13A may be test data corresponding to different overlap ratios of the first projection area to the projection area of the auricular concha cavity on the sagittal plane when the frequency is 3 kHz. As illustrated in FIG. 13A, under different frequencies, the overlap ratio of the first projection area to the projection area of the auricular concha cavity on the sagittal plane may be substantially proportional to the sound pressure level at the earhole. When the first projection area of the sound production device 11 on the sagittal plane overlaps with the projection area of the auricular concha cavity on the sagittal plane, the sound with a specific frequency (e.g., 500 Hz, 1 kHz, and 3 kHz) at the earhole obtained through the measurement may be increased significantly compared with a condition that the first projection area of the sound production device 11 on the sagittal plane does not overlap (the overlap ratio is 0) with the projection area of the auricular concha cavity on the sagittal plane. Accordingly, to ensure the acoustic output quality of the sound production device 11, the overlap ratio of the first projection area of the sound production device 11 on the sagittal plane to the projection area of the auricular concha cavity on the sagittal plane may be within a range of 44.01%-80%. Combined with FIG. 13A, when the overlap ratio is 22% or 32%, the sound pressure level at the earhole may be greater. However, the structure of the sound production device 11 inserted into the auricular concha cavity may be limited, so that the edge of the auricular concha cavity may not support and limit the end of the sound production device 11. When the overlap ratio is too large (e.g., greater than 80%), although the sound pressure level at the earhole is greater, the open state of the earhole may be affected. Preferably, in some embodiments, the overlap ratio of the first projection area of the sound production device 11 on the sagittal plane to the projection area of the auricular concha cavity on the sagittal plane may be within a range of 45%-71.49%.

As illustrated in FIG. 13B, an abscissa may represent a distance between a centroid O of the first projection of the sound production device 11 on the sagittal plane and a centroid P of the projection of the earhole on the sagittal plane, and an ordinate may represent a sound pressure level at the earhole corresponding to different distances. A straight line 1304 may represent a linear relationship fitted with the sound pressure level at the earhole according to the distance between the centroid O of the first projection of the sound production device 11 on the sagittal plane and the centroid P of the projection of the earhole on the sagittal plane when the frequency is 500 Hz. A straight line 1305 may represent a linear relationship fitted with the sound pressure level at the earhole according to the distance between the centroid O of the first projection of the sound production device 11 on the sagittal plane and the centroid P of the projection of the earhole on the sagittal plane when the frequency is 1 kHz. A straight line 1306 may represent a linear relationship fitted with the sound pressure level at the earhole according to the distance between the centroid O of the first projection of the sound production device 11 on the sagittal plane and the centroid P of the projection of the earhole on the sagittal plane when the frequency is 3 kHz. A hollow circular point shown in FIG. 13B may be test data corresponding to different distances between the centroid O of the first projection of the sound production device 11 on the sagittal plane and the centroid P of the projection of the earhole on the sagittal plane when the frequency is 500 Hz. A black circular point shown in FIG. 13B may be test data corresponding to different distances between the centroid O of the first projection of the sound production device 11 on the sagittal plane and the centroid P of the projection of the earhole on the sagittal plane when the frequency is 1 kHz. A circular point with a smaller gray value shown in FIG. 13B may be test data corresponding to different distances between the centroid O of the first projection of the sound production device 11 on the sagittal plane and the centroid P of the projection of the earhole on the sagittal plane when the frequency is 3 kHz. As illustrated in FIG. 13B, under different frequencies, the distance between the centroid O of the first projection of the sound production device 11 on the sagittal plane and the centroid P of the projection of the earhole on the sagittal plane may be a substantially negative correlation to the sound pressure level at the earhole. As a whole, the sound with a specific frequency (e.g., 500 Hz, 1 kHz, and 3 kHz) at the earhole obtained through the measurement may be reduced with an increasing of the distance between the centroid O of the first projection of the sound production device 11 on the sagittal plane and the centroid P of the projection of the earhole on the sagittal plane. Combined with FIG. 13A and FIG. 13B, the greater the distance between the centroid O of the first projection of the sound production device 11 on the sagittal plane and the centroid P of the projection of the earhole on the sagittal plane is, the less the overlap ratio of the first projection area of the sound production device 11 on the sagittal plane to the projection area of the earhole on the sagittal plane is. The overlap ratio may affect a count of leakage structures of the cavity-like structure formed by the sound production device 11 and the ear of the user and the opening size of the leakage structure. The opening size of the leakage structure may affect the sound quality directly. Specifically, the larger the opening of the leakage structure, the more sound components emitted from the sound production device 11 to the outside directly, and the less the sound reached the sound location. In addition, when the distance between the centroid O of the first projection of the sound production device 11 on the sagittal plane and the centroid P of the projection of the earhole on the sagittal plane is too small, the overlap ratio of the first projection area of the sound production device 11 on the sagittal plane to the projection area of the earhole on the sagittal plane may be too large, so that the sound production device 11 may cover the earhole of the user, thereby affecting the user to receive the sound from the outer environment. As illustrated in FIG. 13B, taking the frequency 3 kHz as an example, when the distance between the centroid O of the first projection of the sound production device 11 on the sagittal plane and the centroid P of the projection of the earhole on the sagittal plane is 7 mm and 11 mm, the sound pressure level at the earhole obtained through the measurement may be −72 dB and −70 dB respectively; when the distance between the centroid O of the first projection of the sound production device 11 on the sagittal plane and the centroid P of the projection of the earhole on the sagittal plane is 18 mm and 22 mm, the sound pressure level at the earhole obtained through the measurement may be −80 dB and −84.3 dB respectively. Accordingly, the distance between the centroid O of the first projection of the sound production device 11 on the sagittal plane and the centroid P of the projection of the earhole on the sagittal plane should not be too large. In some embodiments, to ensure the acoustic output quality (e.g., the sound pressure level at the earhole is greater than −80 dB) of the sound production device 11 and to ensure that the user may receive the sound information from the outer environment, the distance between the centroid O of the first projection of the sound production device 11 on the sagittal plane and the centroid P of the projection of the earhole on the sagittal plane may be within a range of 3 mm-15 mm. Preferably, the distance between the centroid O of the first projection of the sound production device 11 on the sagittal plane and the centroid P of the projection of the earhole on the sagittal plane may be within a range of 4 mm-13 mm. Preferably, the distance between the centroid O of the first projection of the sound production device 11 on the sagittal plane and the centroid P of the projection of the earhole on the sagittal plane may be within a range of 8 mm-10 mm.

It should be noted that the frequency response curves corresponding to different overlap ratios, the centroid of the first projection, and the centroid of the projection of the earhole on the sagittal plane obtained through the measurement in the embodiments of the present disclosure may be obtained through the measurement by changing the wearing position (e.g., translation along the sagittal axis direction) of the sound production device based on a certain wearing angle (an angle between the upper sidewall or the lower sidewall and the horizontal direction), a certain size along the long axis direction, a certain size along the short axis direction, and a certain size along the thickness direction.

It should be noted that a position relationship between the sound production device 11 and the auricle, or between the auricular concha cavity and the earhole provided in the embodiments of the present disclosure may be determined by the following exemplary methods: firstly, an image of a head model including an ear may be captured along a direction facing the sagittal plane at a specific position, and an edge of an auricular concha cavity, a contour of an earhole, and a contour (e.g., an inner contour and an outer contour) of an auricle may be labeled, wherein the labeled contour may be considered as a projection contour of each structure of the ear on the sagittal plane; secondly, an image of the head model wearing an open earphone may be captured from a same angle at the specific position, and a contour of a sound production device may be labeled, wherein the contour may be considered as a projection of the sound production device on the sagittal. The position relationship between the sound production device (e.g., a centroid, an end, etc.) and the edge of the auricular concha cavity, the earhole, the inner contour, or the outer contour may be determined through comparison and analyzation.

FIGS. 1-13B and the related descriptions illustrated above may be related to a sound production device whose whole or part of structure is inserted into an auricular concha cavity when an open earphone is in a wearing state. In some embodiments, the sound production device may also not be inserted into the auricular concha cavity. For example, at least part of the sound production device 11 shown in FIG. 14 may cover an anthelix region. As another example, the sound production device 11 shown in FIG. 16E may not cover the anthelix region, and the sound production device 11 may be arranged to be suspended relative to the auricular concha cavity. The following specific illustrations may be provided combined with FIGS. 14-18B.

Figure 14:
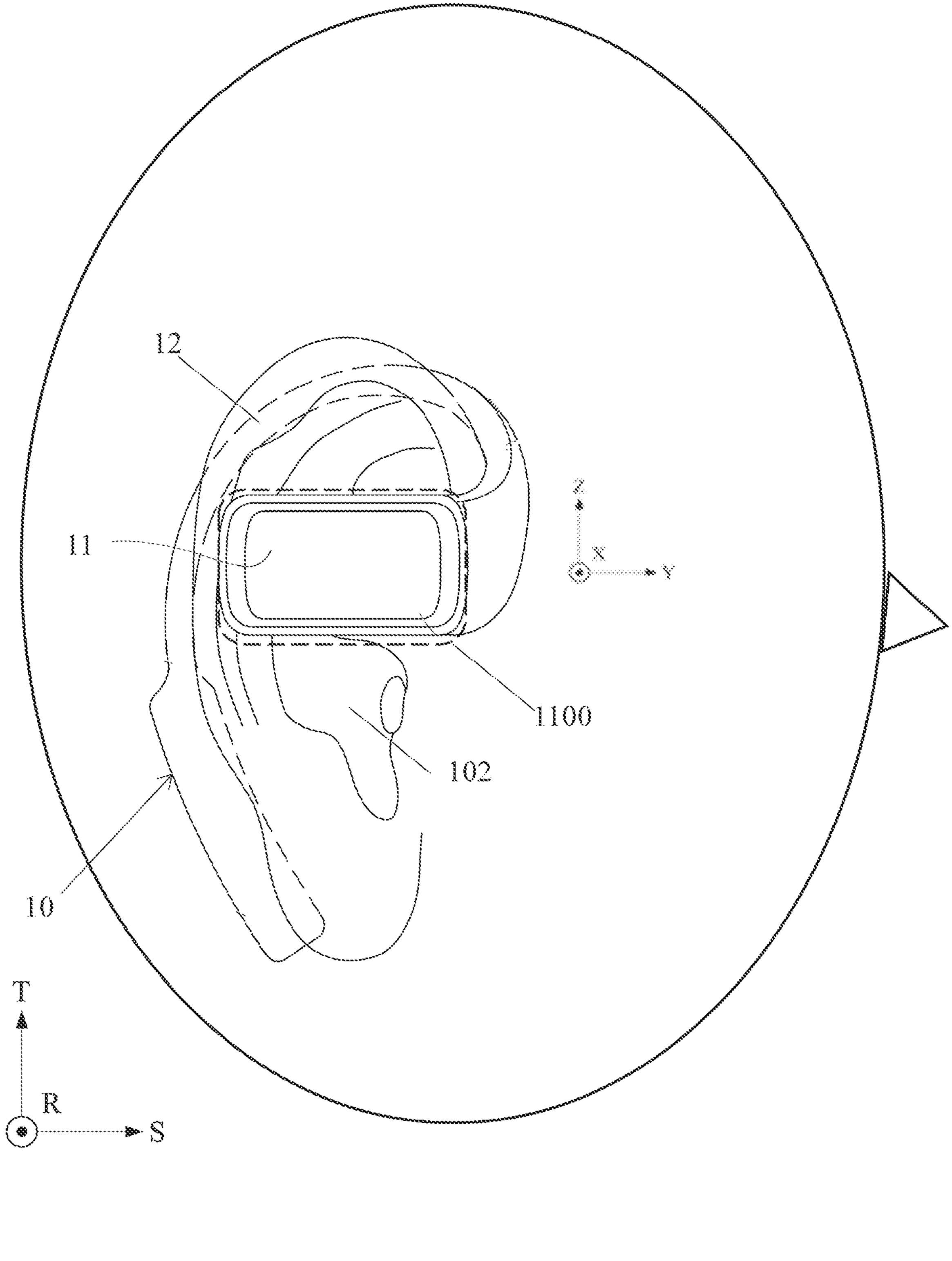
FIG. 14 is a schematic diagram illustrating an exemplary wearing manner of an open earphone according to some embodiments of the present disclosure.

FIG. 14 is a schematic diagram illustrating an exemplary wearing manner of an open earphone according to some embodiments of the present disclosure.

As illustrated in FIG. 14, in some embodiments, when the open earphone is in the wearing state, at least part of the sound production device 11 may cover the anthelix region. The anthelix region may include at least one of the anthelix 105 shown in FIG. 1, the superior crura of antihelix 1011, and an inferior crura of antihelix 1012. At this time, the sound production device 11 may be located at the $M_1$ region (shown in FIG. 1) above the auricular concha cavity 102 and the earhole, so that the earhole of the user may be in the open state. In some embodiments, the housing of the sound production device 11 may include at least one sound hole and pressure relief hole. The sound hole(s) may be acoustic coupled to the front chamber of the open earphone 10, and the pressure relief hole(s) may be acoustic coupled to the rear chamber of the open earphone 10. The sound output from the sound hole(s) and sound output from the pressure relief hole(s) may be substantially considered as two sound sources. The sounds of the two sound sources may have opposite phases to form a dipole. When the user wears the open earphone, the sound hole(s) may be located at a sidewall of the sound production device 11 facing or close to the ear canal of the user, and the pressure relief hole(s) may be located at a sidewall of the sound production device 11 deviated from the ear canal of the user. The housing of the sound production device 11 may act as a baffle to increase an acoustic path difference from the sound hole(s) and the pressure relief hole(s) to the ear canal 101, so that a sound intensity at the ear canal 101 may be increased. Furthermore, the sidewall of the sound production device 11 may abut against and attach to the anthelix region, and a concave-convex structure of the anthelix region may also act as the baffle to increase the acoustic path of the sound emitted from the pressure relief hole(s) to the ear canal 101, thereby increasing the acoustic path difference from the sound hole(s) and the pressure relief hole(s) to the ear canal 101, so that a sound intensity at the ear canal 101 may be increased, and a volume of a far-field leakage may be reduced.

Figure 15:
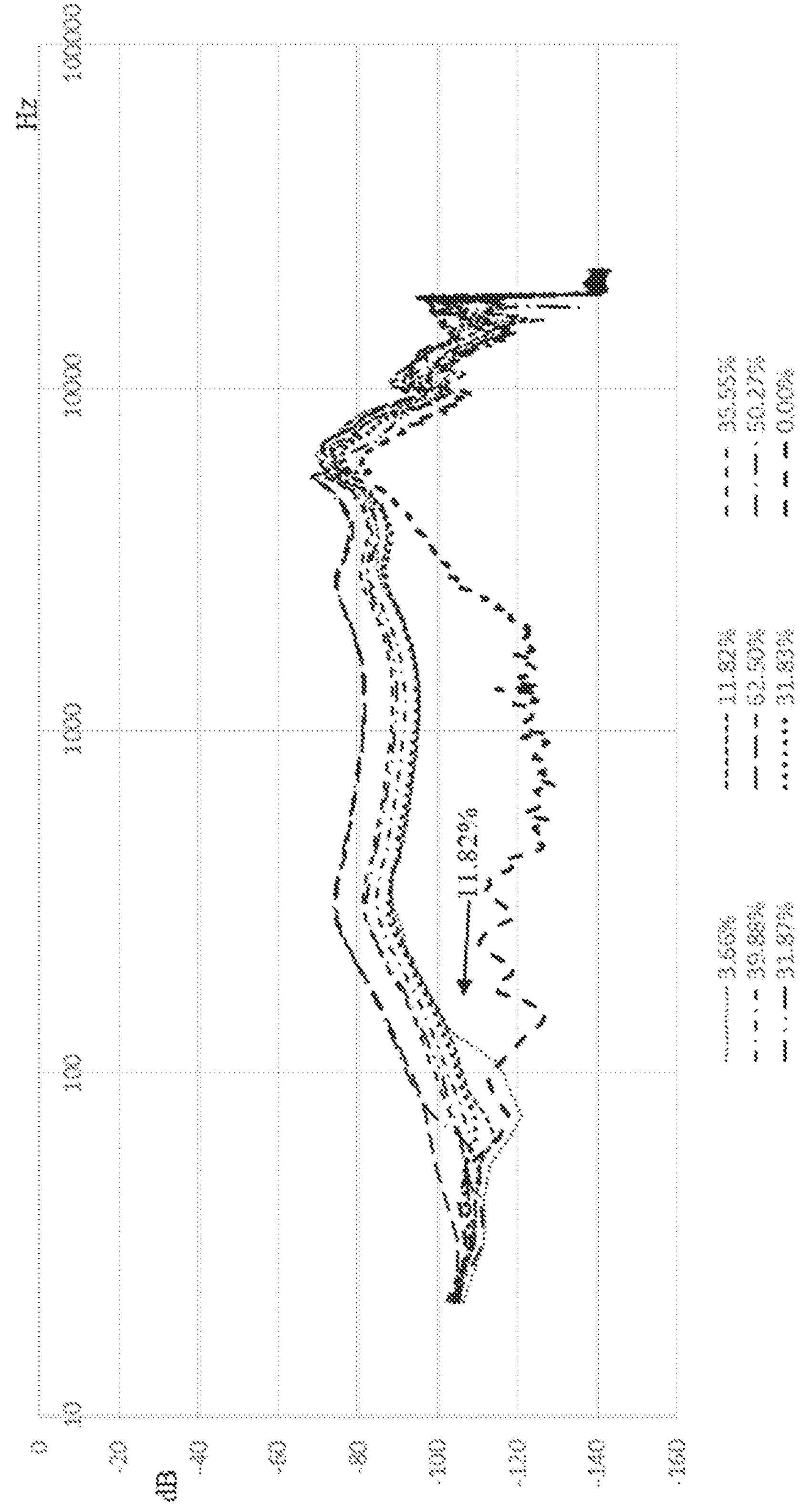
FIG. 15 is a curve diagram illustrating an exemplary frequency response corresponding to different overlap ratios each of which is a ratio of a projection of a first projection to a projection of an auricular concha cavity on a sagittal plane according to some embodiments of the present disclosure.

FIG. 15 is a curve diagram illustrating an exemplary frequency response corresponding to different overlap ratios of a projection of a first projection to a projection of an auricular concha cavity on a sagittal plane according to some embodiments of the present disclosure. As illustrated in FIG. 15, an abscissa may represent a frequency response (unit: Hz), and an ordinate may represent a sound pressure level (unit: dB) at the earhole corresponding to different frequencies. As illustrated in FIG. 15, in a specific experiment, since the sound production device 11 has a certain three-dimensional structure and a whole size, to ensure that the first projection area of the sound production device 11 on the sagittal plane is a fixed value, an experimental value with different overlap ratios may be obtained through a translation manner along the sagittal axis direction and/or the vertical axis direction. The position of the sound production device 11 relative to the anthelix region may be changed through the translation manner. Correspondingly, an action of a baffle formed by the sound production device 11 and the anthelix region may be weakened. Under the wearing state, the sound hole(s) may be usually arranged at the sidewall of the sound production device 11 facing or close to the earhole, and a greater overlap ratio of the first projection area of the sound production device 11 on the sagittal plane to the projection area of the auricular concha cavity on the sagittal plane may indicate that the sound hole(s) of the sound production device 11 may usually closer to the earhole. Therefore, even though the action of the baffle formed by the sound production device 11 and the anthelix region is weakened, the sound volume at the earhole may also be improved. As illustrated in FIG. 15, the sound volume at the earhole may be significantly improved when the overlap ratio of the first projection area of the sound production device 11 on the sagittal plane to the projection area of the auricular concha cavity on the sagittal plane is not less than 11.82% compared with an overlap ratio that is less than 11.821%. That is, a good frequency response may also be generated when the sound production device 11 covers part of the auricular concha cavity and the anthelix region. Accordingly, in some embodiments, to ensure a good sound effect when the user wears the open earphone, the overlap ratio of the first projection area of the sound production device 11 on the sagittal plane to the projection area of the auricular concha cavity on the sagittal plane is not less than 11.82% under a condition that the sound production device 11 covers the anthelix. Preferably, in some embodiments, the overlap ratio of the first projection area of the sound production device 11 on the sagittal plane to the projection area of the auricular concha cavity on the sagittal plane may be not less than 31.83%. Considering that when the overlap ratio of the first projection area of the sound production device 11 on the sagittal plane to the projection area of the auricular concha cavity on the sagittal plane is too large, the sound production device 11 may cover the earhole, so that the earhole may be not able to be kept in the open state completely, thereby affecting the user to receive the sound from the outer environment. Preferably, in some embodiments, the overlap ratio of the first projection area of the sound production device 11 on the sagittal plane to the projection area of the auricular concha cavity on the sagittal plane may be within a range of 11.82%-62.50%. Preferably, in some embodiments, the overlap ratio of the first projection area of the sound production device 11 on the sagittal plane to the projection area of the auricular concha cavity on the sagittal plane may be within a range of 31.83%-50.07%. Preferably, in some embodiments, the overlap ratio of the first projection area of the sound production device 11 on the sagittal plane to the projection area of the auricular concha cavity on the sagittal plane may be within a range of 35.55%-45%. It should be noted that the frequency response curves corresponding to the overlap ratio of the first projection area to the projection area of the auricular concha cavity of the user on the sagittal plane obtained through the measurement in the embodiments of the present disclosure may be obtained through the measurement by changing the wearing position (e.g., translation along the sagittal axis direction) of the sound production device based on a certain wearing angle (an angle between the upper sidewall or the lower sidewall and the horizontal direction, e.g., an angle between the upper sidewall and the horizontal direction is 0°) and a certain size of the sound production device.

Under a wearing manner that at least part of the sound production device 11 covers the anthelix of the user, since the sound production device 11 is not inserted into the auricular concha cavity, the angle between the sound production device 11 and the sagittal plane may be relatively smaller compared with a wearing manner that at least part of the sound production device 11 of the open earphone is inserted into the auricular concha cavity shown in FIG. 3. Therefore, under the wearing manner that at least part of the sound production device 11 covers the anthelix region of the user, the projection area of the sound production device of the open earphone on the sagittal plane shown in FIG. 14 may be relatively greater than the projection area of the sound production device of the open earphone on the sagittal plane shown in FIG. 14. For example, in some embodiments, under the wearing state, the first projection area of the sound production device 11 on the sagittal plane may be within a range of 236 $mm^2$-565 $mm^2$. In some embodiments, to avoid a generated worse action of the baffle caused by a too small first projection area of the sound production device 11 on the sagittal plane, and to avoid affecting the user to receive the sound from the outer environment caused by a too large first projection area of the sound production device 11 on the sagittal plane covering the earhole, under the wearing state, the first projection area of the sound production device 11 on the sagittal plane may be within a range of 250 $mm^2$-550 $mm^2$. Preferably, under the wearing state, the first projection area of the sound production device 11 on the sagittal plane may be within a range of 270 $mm^2$-500 $mm^2$. Preferably, under the wearing state, the first projection area of the sound production device 11 on the sagittal plane may be within a range of 290 $mm^2$-450 $mm^2$. Preferably, under the wearing state, the first projection area of the sound production device 11 on the sagittal plane may be within a range of 320 $mm^2$-410 $mm^2$.

As illustrated in FIG. 14, the first projection shape (e.g., the region 1100 enclosed by the dotted line shown in FIG. 14) of the sound production device 11 on the sagittal plane may include the long axis direction (e.g., Y-axis direction) and the short axis direction (e.g., Z-axis direction). In some embodiments, considering that when the size of the sound production device 11 along the long axis direction Y or the short axis direction Z is too small, the volume of the sound production device 11 may be smaller relatively, and an area of the vibration diaphragm arranged in the sound production device 11 may also be smaller relatively, which causes a low efficiency of generating the sound by driving the air in the housing of the sound production device 11 through the vibration diaphragm, thereby affecting an acoustic output effect of the open earphone. Furthermore, when the size of the sound production device 11 along the long axis direction Y or the short axis direction Z is too small, the distance between the sound hole(s) and the pressure relief hole(s) may be too small, which causes a smaller acoustic path difference between the sound at the sound hole(s) and the sound at the pressure relief hole(s), thereby affecting the sound volume at the earhole of the user. However, when the size of the sound production device 11 along the long axis direction Y is too large, the sound production device 11 may be beyond the auricle of the user, which causes an uncomfortable wearing experience. In addition, when the size of the sound production device 11 along the long axis direction Y is too small, a gap may be formed between the end FE of the sound production device 11 and the inner contour 1014 of the auricle, a short circuit of the sound emitted from the sound hole(s) and the sound emitted from the pressure relief hole(s) may occur at a region between the end FE of the sound production device 11 and the inner contour 1014 of the auricle, so that the sound volume at the earhole may be reduced. The larger the region between the end FE of the sound production device 11 and the inner contour 1014 of the auricle, the more obvious the phenomenon of the acoustic short circuit. When the size of the sound production device 11 along the short axis direction Z is too large, the sound production device 11 may cover the earhole of the user to affect the user receiving the sound from the outer environment. In some embodiments, to ensure a good acoustic output quality and a wearing comfortability when the user wears the open earphone 10, a size of the first projection shape along the long axis direction Y may be within a range of 21 mm-33 mm. Preferably, the size of the first projection shape along the long axis direction Y may be within a range of 21.5 mm-31 mm. Preferably, the size of the first projection shape along the long axis direction Y may be within a range of 21.5 mm-26.5 mm. Correspondingly, the size of the first projection shape along the short axis direction Z may be within a range of 11 mm-18 mm. Preferably, the size of the first projection shape along the short axis direction Z may be within a range of 11.5 mm-16.5 mm. Preferably, the size of the first projection shape along the short axis direction Z may be within a range of 11.5 mm-16 mm. To further illustrate the effect of the first projection shape of the sound production device 11 on the sagittal plane on the sound performance when the user wears the open earphone, the following may be an exemplary illustration of a ratio of the size of the first projection shape of the sound production device 11 on the sagittal plane along the long axis direction Y to the size of the first projection shape of the sound production device 11 on the sagittal plane along the short axis direction Z.

Under a certain wearing manner (e.g., a fixed wearing position and a fixed wearing angle), for the wearing manner that the sound production device covers the anthelix, an influence of the ratio of the size of the first projection shape along the long axis direction Y to the size of the first projection shape along the short axis direction Z on the acoustic output effect of the sound production device 11 may be considered substantially the same as the wearing manner that the sound production device 11 is inserted into the auricular concha cavity as illustrated above. When the ratio of the size of the first projection shape along the long axis direction Y to the size of the first projection shape along the short axis direction Z is within a range of 1.0-3.0, the frequency response curve of the sound production device 11 may be generally smooth, and the frequency response may be good within a range of medium and low frequency band. When the frequency is within a range of high frequency band, the greater the ratio of the size of the first projection shape along the long axis direction Y to the size of the first projection shape along the short axis direction Z is, the faster the sound frequency response of the sound production device 11 decreases at the earhole. Accordingly, in some embodiments, to ensure a good acoustic output effect when the user wears the open earphone, the ratio of the size of the first projection shape of the sound production device 11 on the sagittal plane along the long axis direction Y to the size of the first projection shape of the sound production device 11 on the sagittal plane along the short axis direction Z may be within a range of 1.0-3.0. Similarly, to ensure the wearing stability and comfortability, in some embodiments, the ratio of the size of the first projection shape of the sound production device 11 on the sagittal plane along the long axis direction Y to the size of the first projection shape of the sound production device 11 on the sagittal plane along the short axis direction Z may be within a range of 1.4-2.5. Preferably, the ratio of the size of the first projection shape of the sound production device 11 on the sagittal plane along the long axis direction Y to the size of the first projection shape of the sound production device 11 on the sagittal plane along the short axis direction Z may be within a range of 1.4-2.3. Preferably, the ratio of the size of the first projection shape of the sound production device 11 on the sagittal plane along the long axis direction Y to the size of the first projection shape of the sound production device 11 on the sagittal plane along the short axis direction Z may be within a range of 1.45-2.0.

It should be noted that the frequency response curves corresponding to different sizes along the long axis direction Y and the short axis direction Z obtained through the measurement in the embodiments of the present disclosure may be obtained through the measurement by changing the size along the long axis direction and the short axis direction based on a certain wearing angle (an angle between the upper sidewall or the lower sidewall and the horizontal direction) and a wearing position.

Similarly, under a certain wearing manner (e.g., a fixed wearing position and a fixed wearing angle), for the wearing manner that the sound production device covers the anthelix, an influence of the thickness of the sound production device 11 on the acoustic output effect of the sound production device 11 may be considered substantially the same as the wearing manner that the sound production device 11 is inserted into the auricular concha cavity as illustrated above. The size (also referred to as the thickness) of the sound production device 11 along the thickness direction X may be proportional to the size of the front chamber of the sound production device 11 along the thickness direction X. The smaller the size of the front chamber along the thickness direction X is, the greater the resonance frequency corresponding to a resonant peak of the front chamber is, and the frequency response curve within a lower frequency band range (100 Hz-1000 Hz) may be smoother. In some embodiments, the sound hole(s) may be acoustic coupled to the front chamber, and the sound in the front chamber may be transmitted to the earhole of the user through the sound hole(s) and received by the auditory system of the user. If the size of the sound production device 11 along the thickness direction X is too large, and the resonance frequency corresponding to the resonant peak of the front chamber corresponding to the sound production device 11 is too small, the acoustic performance of the sound production device 11 may be affected within the lower frequency band. In addition, under the wearing state, a larger whole size or weight of the sound production device 11 may affect the wearing stability and comfortability. When the size of the sound production device 11 along the thickness direction X is too small, a space of the front chamber and the rear chamber of the sound production device 11 may be limited to affect a vibration amplitude of the vibration diaphragm, so that the output of the sound production device 11 at a lower frequency may be restricted. Accordingly, to ensure a good acoustic output effect and the wearing stability of the sound production device 11, in some embodiments, the thickness (the size of the sound production device 11 along the thickness direction) of the sound production device 11 may be within in range of 2 mm-20 mm. Preferably, the thickness of the sound production device 11 may be within in range of 5 mm-15 mm. Preferably, the thickness of the sound production device 11 may be within in range of 8 mm-12 mm. It should be noted that, under the wearing state, when at least one wall surface of two sidewalls (i.e., an inner sidewall facing outside of the ear of the user and an outer sidewall deviated from outside of the ear of the user) of the sound production device 11 opposite to each other that are arranged along the thickness direction X is a non-planar surface, the thickness of the sound production device 11 may be a maximum distance between the inner sidewall and the outer sidewall along the thickness direction X.

It should be noted that the frequency response curves corresponding to different thickness obtained through the measurement in the embodiments of the present disclosure may be obtained through the measurement by changing the size along the thickness axis direction based on a certain wearing angle (an angle between the upper sidewall or the lower sidewall and the horizontal direction, e.g., an angle between the upper sidewall and the horizontal direction is 0°), a certain wearing position, a certain size along the long axis direction, and a certain size along the short axis direction.

Figure 16A:
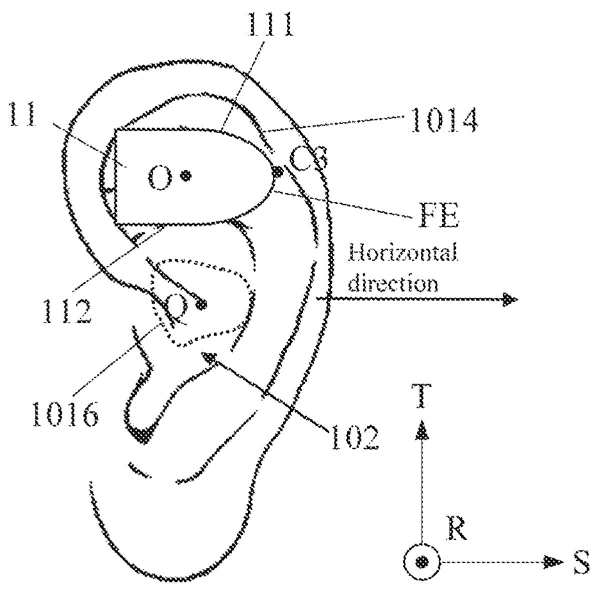
FIG. 16A is a schematic diagram illustrating an exemplary wearing manner of an open earphone according to some embodiments of the present disclosure.
Figure 16B:
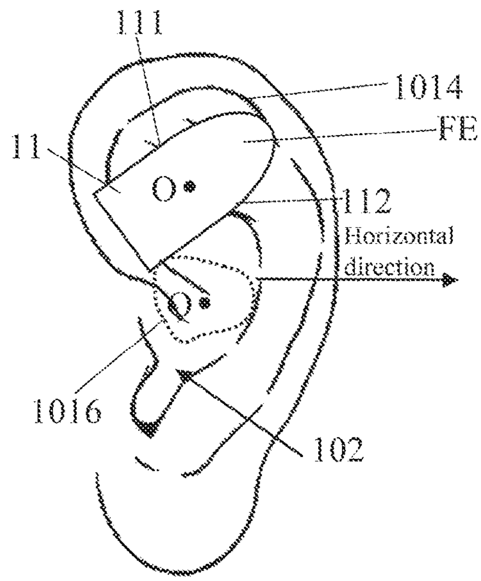
FIG. 16B is a schematic diagram illustrating an exemplary wearing manner of an open earphone according to some embodiments of the present disclosure.
Figure 16C:
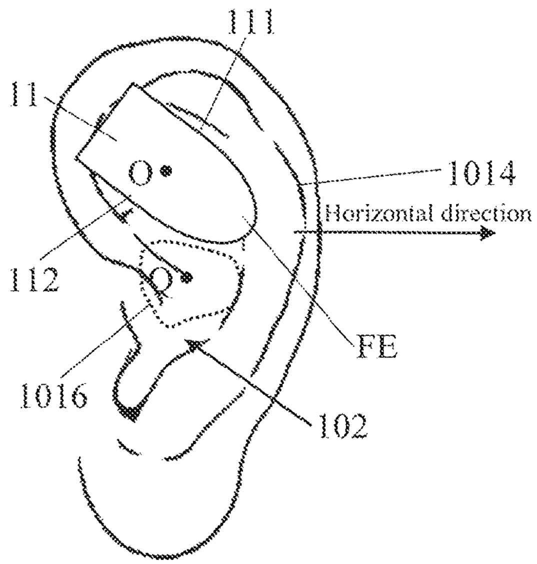
FIG. 16C is a schematic diagram illustrating an exemplary wearing manner of an open earphone according to some embodiments of the present disclosure.
Figure 16D:
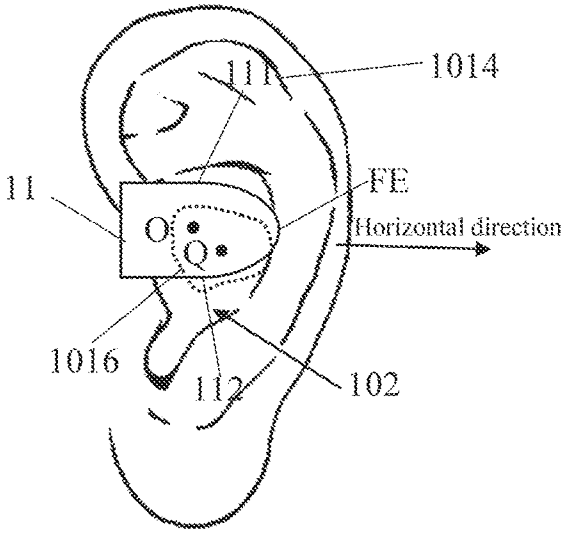
FIG. 16D is a schematic diagram illustrating an exemplary wearing manner of an open earphone according to some embodiments of the present disclosure.
Figure 16E:
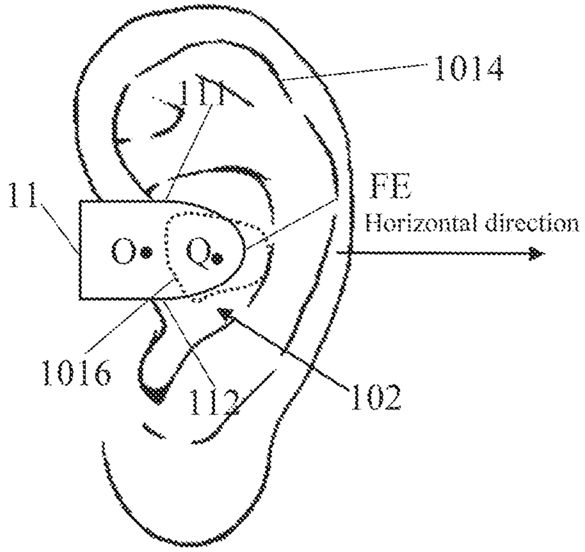
FIG. 16E is a schematic diagram illustrating an exemplary wearing manner of an open earphone according to some embodiments of the present disclosure.

FIGS. 16A-16E are schematic diagrams illustrating exemplary wearing manners of an open earphone according to some embodiments of the present disclosure. As illustrated in FIG. 16A, FIG. 16D, and FIG. 16E, in some embodiments, under the wearing state, the upper sidewall 111 (also referred to as the upper side surface) of the sound production device 11 or the lower sidewall 112 (also referred to as the lower side surface) may be parallel to or substantially parallel to the horizontal plane. As illustrated in FIG. 16A, in some embodiments, the projection of the end FE of the sound production device 11 on the sagittal plane may be located in a region between the projection of the inner contour 1014 of the auricle on the sagittal plane and the projection of the edge of the auricular concha cavity 102 on the sagittal plane. That is, the centroid of the projection of the end FE of the sound production device 11 on the sagittal plane may be located between the projection of the inner contour 1014 of the auricle on the sagittal plane and the projection of the edge of the auricular concha cavity 102 on the sagittal plane. As illustrated in FIG. 16D, in some embodiments, the end FE of the sound production device 11 may abut against the edge of the auricular concha cavity 102. The fixed end of the sound production device 11 may be located at a front side of the tragus, and at least part of the sound production device 11 may cover the auricular concha cavity 102 of the user. As illustrated in FIG. 16E, in some embodiments, the centroid of the projection of the end FE of the sound production device 11 on the sagittal plane may be located in the projection of the auricular concha cavity 102 on the sagittal plane, and the projection of the fixed end of the sound production device 11 on the sagittal plane may be located outside the projection of the auricle of the user on the sagittal plane.

As illustrated in FIG. 16B and FIG. 16C, in some embodiments, under the wearing state, the upper sidewall 111 of the sound production device 11 or the lower sidewall 112 may be tilted with a certain angle relative to the horizontal plane. As illustrated in FIG. 16B, in some embodiments, the end FE of the sound production device 11 may be tilted toward a region of an upper portion of the auricle relative to the fixed end of the sound production device 11, and the end FE of the sound production device 11 may abut against the inner contour 1014 of the auricle. As illustrated in FIG. 16C, in some embodiments, the fixed end of the sound production device 11 may be tilted toward the region of the upper portion of the auricle relative to the end FE of the sound production device 11, and the end FE of the sound production device 11 may be located between the edge of the auricular concha cavity 102 and the inner contour 1014 of the auricle. That is, the midpoint C3 of the projection of the end FE of the sound production device 11 on the sagittal plane may be located between the projection of the inner contour 1014 of the auricle on the sagittal plane and the projection of the edge of the auricular concha cavity 102 on the sagittal plane.

It should be understood that, under the wearing state of the user, a too large distance of the midpoint C3 of the projection of the end FE of the sound production device 11 on the sagittal plane relative to the projection of the inner contour 1014 of the auricle on the sagittal plane may cause the end FE of the sound production device 11 to be unable to abut against the inner contour 1014 of the auricle, which also causes that the sound production device 11 may be not limited, so that the sound production device 11 may easily fall off. In addition, if the distance between the centroid O of the first projection and a point of a certain region of a boundary of a second projection is too large, the gap may be formed between the end FE of the sound production device 11 and the inner contour 1014 of the auricle, and the short circuit of the sound emitted from the sound hole(s) and the sound emitted from the pressure relief hole(s) may occur at a region between the end FE of the sound production device 11 and the inner contour 1014 of the auricle, so that the sound volume at the earhole may be reduced. The larger the region between the end FE of the sound production device 11 and the inner contour 1014 of the auricle, the more obvious the phenomenon of the acoustic short circuit. It should be noted that the inner contour 1014 of the auricle may be the inner wall of the helix. Correspondingly, the outer contour 1013 may be the outer wall of the helix. In some embodiments, to ensure a good wearing stability of the open earphone, the distance of the midpoint C3 of the projection of the end FE of the sound production device 11 on the sagittal plane relative to the projection of the inner contour 1014 of the auricle on the sagittal plane may be not less than 8 mm. Preferably, the distance of the midpoint C3 of the projection of the end FE of the sound production device 11 on the sagittal plane relative to the projection of the inner contour 1014 of the auricle on the sagittal plane may be within a range of 0 mm-6 mm. Preferably, the distance of the midpoint C3 of the projection of the end FE of the sound production device 11 on the sagittal plane relative to the projection of the inner contour 1014 of the auricle on the sagittal plane may be within a range of 0 mm-5.5 mm. In some embodiments, the distance of the midpoint C3 of the projection of the end FE of the sound production device 11 on the sagittal plane relative to the projection of the inner contour 1014 of the auricle on the sagittal plane may be 0. When the distance is 0, the end FE of the sound production device 11 may abut against the inner contour 1014 of the auricle. At this time, the sound production device 11 may abut against the inner contour 1014 of the auricle under the wearing state to improve the wearing stability of the open earphone. In addition, the region between the end FE of the sound production device 11 and the inner contour 1014 of the auricle may be reduced as much as possible, to reduce the acoustic short circuit region around the sound production device 11, thereby improving the sound volume at the earhole of the user. It should be noted that, in a specific scenario, another point of the projection of the end FE of the sound production device 11 on the sagittal plane except for the midpoint C3 may abut against the inner contour 1014 of the auricle. At this time, the distance between the midpoint C3 of the projection of the end FE of the sound production device 11 on the sagittal plane and the projection of the inner contour 1014 of the auricle on the sagittal plane may be greater than 0 mm. In some embodiments, the distance between the midpoint C3 of the projection of the end FE of the sound production device 11 on the sagittal plane and the projection of the inner contour 1014 of the auricle on the sagittal plane may be within a range of 2 mm-10 mm. Preferably, the distance between the midpoint C3 of the projection of the end FE of the sound production device 11 on the sagittal plane and the projection of the inner contour 1014 of the auricle on the sagittal plane may be within a range of 4 mm-8 mm.

It should be noted that, in the present disclosure, the end FE of the sound production device 11 may be an end far away from a connection between the sound production device 11 and the ear hook. When the projection of the end FE of the sound production device 11 on the sagittal plane is a curve or broken line, the midpoint C3 of the projection of the end FE of the sound production device 11 on the sagittal plane may be selected through the following exemplary methods: a line segment may be determined through a start point and an end point of the projection of the end FE of the sound production device 11 on the sagittal plane, a vertical centerline may be determined through a midpoint on the line segment, and an intersecting point between the vertical centerline and the projection may be determined as the midpoint C3 of the projection of the end FE of the sound production device 11 on the sagittal plane. In some embodiments, when the end FE of the sound production device 11 is a curved surface, a tangent point on a tangent line of the projection that is parallel to the short axis direction Z may be determined as the midpoint of the projection of the end FE of the sound production device 11 on the sagittal plane.

In addition, in the embodiments of the present disclosure, the distance between the midpoint of the projection of the end FE of the sound production device 11 on the sagittal plane and the projection of the inner contour 1014 of the auricle on the sagittal plane may be a minimum distance between the midpoint of the projection of the end FE of the sound production device 11 on the sagittal plane and the projection of the inner contour 1014 of the auricle on the sagittal plane. Alternatively, the distance between the midpoint C3 of the projection of the end FE of the sound production device 11 on the sagittal plane and the projection of the inner contour 1014 of the auricle on the sagittal plane may be a distance between the midpoint C3 of the projection of the end FE of the sound production device 11 on the sagittal plane and the projection of the inner contour 1014 of the auricle on the sagittal plane along the sagittal axis.

A length of the baffle formed by the sound production device 11 and the anthelix region may be related to a distance range between the midpoint C3 of the projection of the end FE of the sound production device 11 on the sagittal plane and the projection of the inner contour 1014 of the auricle on the sagittal plane. For example, the smaller the distance between the midpoint C3 of the projection of the end FE of the sound production device 11 on the sagittal plane and the projection of the inner contour 1014 of the auricle on the sagittal plane is, the greater the length of the baffle formed by the sound production device 11 and the anthelix region, the greater the acoustic path difference of the sound hole(s) and the pressure relief hole(s) to the ear canal 101, and the stronger the sound intensity of the sound received at the ear canal 101. In addition, an angle of the projection of the upper sidewall 111 or the lower sidewall 112 of the sound production device 11 on the sagittal plane relative to the horizontal direction may also affect the position of the sound hole(s) relative to the earhole. For example, the smaller the angle of the projection of the upper sidewall 111 or the lower sidewall 112 of the sound production device 11 on the sagittal plane relative to the horizontal direction is, the closer the sound hole(s) to the earhole. The following specific illustrations may be provided based on the FIGS. 16A-16E.

In some embodiments, the shape of the sound production device 11 may be a regular shape such as a rectangle, a substantially rectangle (e.g., a shape of runway), a cylinder, or the like, or other irregular shapes. As illustrated in FIG. 16A, FIG. 16D, and FIG. 16E, in some embodiments, when the sound production device 11 is in a shape of substantially rectangle, the upper sidewall 111 or the lower sidewall 112 of the sound production device 11 under the wearing state may be parallel or substantially parallel to the horizontal direction. At this time, an angle of the projection of the upper sidewall 111 or the lower sidewall 112 of the sound production device 11 on the sagittal plane relative to the horizontal direction may be within a range of 0°-20°, and the distance range between the midpoint C3 of the projection of the end FE of the sound production device 11 on the sagittal plane and the projection of the inner contour 1014 of the auricle on the sagittal plane may be within a range of 0 mm-18 mm. Merely by way of example, when the wearing manner is a wearing manner shown in FIG. 16A, the angle of the projection of the upper sidewall 111 or the lower sidewall 112 of the sound production device 11 on the sagittal plane relative to the horizontal direction may be within a range of 5°-15°, and the distance range between the midpoint C3 of the projection of the end FE of the sound production device 11 on the sagittal plane and the projection of the inner contour 1014 of the auricle on the sagittal plane may be within a range of 0 mm-11 mm. When the wearing manner is a wearing manner shown in FIG. 16D, the angle of the projection of the upper sidewall 111 or the lower sidewall 112 of the sound production device 11 on the sagittal plane relative to the horizontal direction may be within a range of 7°-12°, and the distance range between the midpoint C3 of the projection of the end FE of the sound production device 11 on the sagittal plane and the projection of the inner contour 1014 of the auricle on the sagittal plane may be within a range of 3 mm-12 mm. When the wearing manner is a wearing manner shown in FIG. 16E, the angle of the projection of the upper sidewall 111 or the lower sidewall 112 of the sound production device 11 on the sagittal plane relative to the horizontal direction may be within a range of 8°-10°, and the distance range between the midpoint C3 of the projection of the end FE of the sound production device 11 on the sagittal plane and the projection of the inner contour 1014 of the auricle on the sagittal plane may be within a range of 8 mm-12 mm. In some embodiments, when the open earphone is in the wearing state, the end FE of the sound production device 11 may abut against the inner contour 1014 of the auricle. At the same time, the ear hook may be fitted with the rear side of the ear of the user, so that the ear of the user may be clamped from the front side and the rear side based on a cooperation between the sound production device 11 and the ear hook, thereby increasing the resistance force preventing the falling off of the open earphone 10 from the ear, and improving the wearing stability of the open earphone 10.

As illustrated in FIGS. 16B and 16C, in some embodiments, the upper sidewall 111 of the sound production device 11 or the lower sidewall 112 may be tilted with a certain angle relative to the horizontal plane. However, when the angle of the upper sidewall 111 or the lower sidewall 112 of the sound production device 11 relative to the horizontal direction is too large, the sound production device 11 may beyond the auricle of the user, which causes a problem of wearing uncomfortable experience and wearing instability. Therefore, to ensure the area of the sound production device 11 covering the anthelix region and a good sound intensity at the earhole, and also to ensure a good wearing stability and wearing comfortability of the open earphone, in some embodiments, in some embodiments, when the open earphone is in the wearing state, the angle of the projection of the upper sidewall 111 or the lower sidewall 112 of the sound production device 11 on the sagittal plane relative to the horizontal direction may be not greater than 43°. In some embodiments, when the wearing manner is a wearing manner shown in FIG. 16B and FIG. 16C, the angle of the projection of the upper sidewall 111 or the lower sidewall 112 of the sound production device 11 on the sagittal plane relative to the horizontal direction may be within a range of 0°-43°, and the distance range between the midpoint C3 of the projection of the end FE of the sound production device 11 on the sagittal plane and the projection of the inner contour 1014 of the auricle on the sagittal plane may be within a range of 0 mm-15 mm. Merely by way of example, when the wearing manner is a wearing manner shown in FIG. 16B, the angle of the projection of the upper sidewall 111 or the lower sidewall 112 of the sound production device 11 on the sagittal plane relative to the horizontal direction may be within a range of 30°-45°, and the distance range between the midpoint C3 of the projection of the end FE of the sound production device 11 on the sagittal plane and the projection of the inner contour 1014 of the auricle on the sagittal plane may be within a range of 0 mm-10 mm. When the wearing manner is a wearing manner shown in FIG. 16C, the angle of the projection of the upper sidewall 111 or the lower sidewall 112 of the sound production device 11 on the sagittal plane relative to the horizontal direction may be within a range of 25°-45°, and the distance range between the midpoint C3 of the projection of the end FE of the sound production device 11 on the sagittal plane and the projection of the inner contour 1014 of the auricle on the sagittal plane may be within a range of 3 mm-11 mm.

It should be noted that an angle between the projection of the upper sidewall 111 of the sound production device 11 on the sagittal plane and the horizontal direction may be the same as or different from an angle between the projection of the lower sidewall 112 of the sound production device 11 on the sagittal plane and the horizontal direction. For example, when the upper sidewall 111 of the sound production device 11 is parallel to the lower sidewall 112, the angle between the projection of the upper sidewall 111 of the sound production device 11 on the sagittal plane and the horizontal direction may be the same as the angle between the projection of the lower sidewall 112 of the sound production device 11 on the sagittal plane and the horizontal direction. As another example, when the upper sidewall 111 of the sound production device 11 is not parallel to the lower sidewall 112, or one of the upper sidewall 111 and the lower sidewall 112 is a planar wall, another is a non-planar wall (e.g., a curved wall), the angle between the projection of the upper sidewall 111 of the sound production device 11 on the sagittal plane and the horizontal direction may be different from the angle between the projection of the lower sidewall 112 of the sound production device 11 on the sagittal plane and the horizontal direction. In addition, when the upper sidewall 111 or the lower sidewall 112 is a curved surface or a concave-convex surface, the projection of the upper sidewall 111 or the lower sidewall 112 on the sagittal plane may be a curve or a broken line. At this time, the angle between the projection of the upper sidewall 111 of the sound production device 11 on the sagittal plane and the horizontal direction may be an angle between a tangent line of a point on the curve or broken line with a maximum distance relative to a ground level and the horizontal direction, and the angle between the projection of the lower sidewall 112 of the sound production device 11 on the sagittal plane and the horizontal direction may be an angle between a tangent line of a point on the curve or broken line with a minimum distance relative to the ground level and the horizontal direction.

It should be noted that the sound production device 11 of the open earphone 11 shown in FIG. 14 may also not cover the anthelix region. For example, taking the wearing position shown in FIG. 16E as an example, the sound production device 11 may be not inserted into the auricular concha cavity. However, the sound production device 11 may face a sidewall of the outside of the ear of the user and may be arranged to be suspended relative to the auricular concha cavity of the user. That is, the sound production device 11 may act as the baffle. The greater the overlap ratio of the first projection area of the sound production device 11 on the sagittal plane to the projection area of the auricular concha cavity on the sagittal plane is, the closer sound hole(s) of the sound production device 11 to the earhole, and the larger the sound volume at the earhole of the user. The distance between the projection of the end FE of the sound production device 11 on the sagittal plane and the projection of the edge of the auricular concha cavity on the sagittal plane may be proportional to the overlap ratio of the first projection area of the sound production device 11 on the sagittal plane to the projection area of the auricular concha cavity on the sagittal plane. Furthermore, the position of the sound hole(s) of the sound production device 11 relative to the earhole may be proportional to the distance between the projection of the end FE of the sound production device 11 on the sagittal plane and the projection of the edge of the auricular concha cavity on the sagittal plane. The following specific illustration may be provided combined with FIG. 17.

Figure 17:
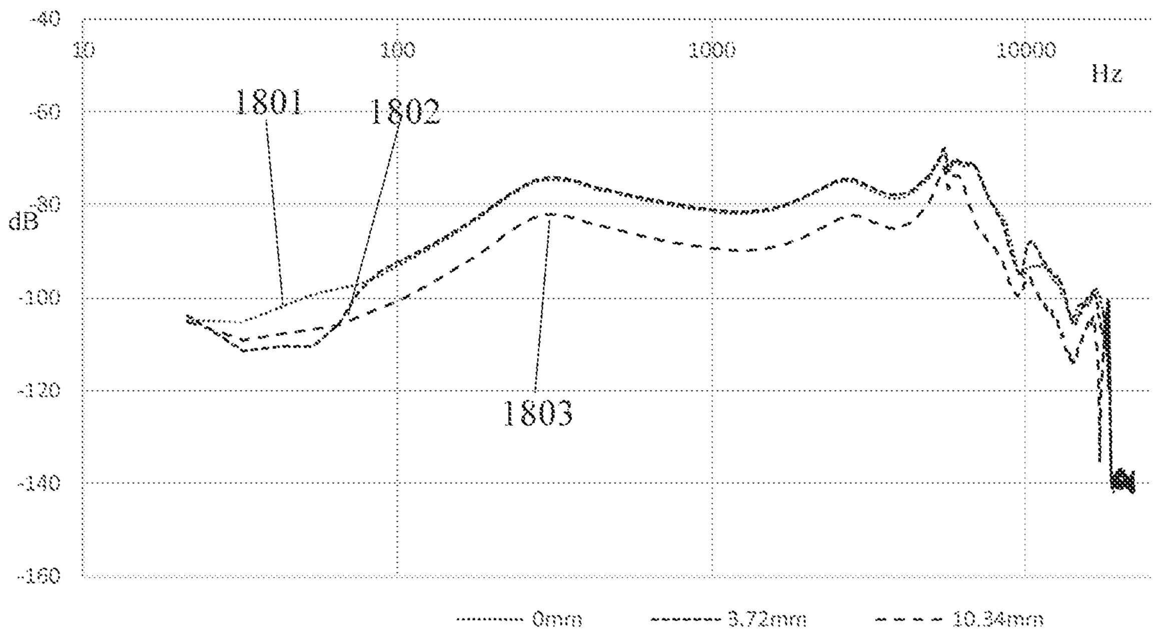
FIG. 17 is a curve diagram illustrating an exemplary frequency response corresponding to different distances between a projection of an end of a sound production device shown in FIG. 16E and a projection of an edge of an auricular concha cavity on a sagittal plane according to some embodiments of the present disclosure.

FIG. 17 is a curve diagram illustrating an exemplary frequency response corresponding to different distances between a projection of an end of a sound production device shown in FIG. 16E and a projection of an edge of an auricular concha cavity on a sagittal plane according to some embodiments of the present disclosure. As illustrated in FIG. 17, an abscissa may represent a frequency response (unit: Hz), and an ordinate may represent a sound pressure level (unit: dB) at the earhole corresponding to different frequencies. A curve 1801 may be a frequency response curve when the distance between the projection of the end of the sound production device 11 on the sagittal plane and the projection of the edge of the auricular concha cavity on the sagittal plane is 0. A curve 1802 may be a frequency response curve when the distance between the projection of the end of the sound production device 11 on the sagittal plane and the projection of the edge of the auricular concha cavity on the sagittal plane is 3.72 mm. A curve 1803 may be a frequency response curve when the distance between the projection of the end of the sound production device 11 on the sagittal plane and the projection of the edge of the auricular concha cavity on the sagittal plane is 10.34 mm. As illustrated in FIG. 17, the frequency response when the distance between the projection of the end of the sound production device 11 on the sagittal plane and the projection of the edge of the auricular concha cavity on the sagittal plane is 0 and 3.72 mm may be better than the frequency response when the distance between the projection of the end of the sound production device 11 on the sagittal plane and the projection of the edge of the auricular concha cavity on the sagittal plane is 10.34 mm. Accordingly, in some embodiments, to ensure a good sound effect of the open earphone 10, the distance between the projection of the end FE of the sound production device 11 on the sagittal plane and the projection of the edge of the auricular concha cavity on the sagittal plane may be not greater than 10.34 mm. Preferably, the distance between the projection of the end FE of the sound production device 11 on the sagittal plane and the projection of the edge of the auricular concha cavity on the sagittal plane may be within a range of 0 mm-7 mm. Preferably, the distance between the projection of the end FE of the sound production device 11 on the sagittal plane and the projection of the edge of the auricular concha cavity on the sagittal plane may be within a range of 0 mm-5 mm. Preferably, the distance between the projection of the end FE of the sound production device 11 on the sagittal plane and the projection of the edge of the auricular concha cavity on the sagittal plane may be within a range of 0 mm-3.72 mm. It should be noted that, in a specific scenario, another point of the projection of the end FE of the sound production device 11 on the sagittal plane except for the midpoint C3 may also abut against the edge of the auricular concha cavity. At this time, the distance between the midpoint C3 of the projection of the end of the sound production device 11 on the sagittal plane and the projection of the edge of the auricular concha cavity on the sagittal plane may be greater than 0 mm. In some embodiments, the distance between the midpoint C3 of the projection of the end of the sound production device 11 on the sagittal plane and the projection of the edge of the auricular concha cavity on the sagittal plane may be 2 mm-7 mm. Preferably, the distance between the midpoint C3 of the projection of the end of the sound production device 11 on the sagittal plane and the projection of the edge of the auricular concha cavity on the sagittal plane may be 2 mm-3.74 mm. It should be noted that the frequency response curves corresponding to different distances between the midpoint C3 of the projection of the end of the sound production device 11 on the sagittal plane and the projection of the edge of the auricular concha cavity on the sagittal plane obtained through the measurement in the embodiments of the present disclosure may be obtained through the measurement by changing the wearing position (e.g., translation along the sagittal axis direction) of the sound production device based on a certain wearing angle (an angle between the upper sidewall or the lower sidewall and the horizontal direction, e.g., an angle between the upper sidewall and the horizontal direction is 0°), a certain size along the long axis direction, a certain size along the short axis direction, and a certain size along the thickness direction.

As illustrated in FIGS. 16A-16C, with a certain size of the sound production device 11 and the auricle of the user and a certain angle of the sound production device 11 under the wearing state relative to the horizontal direction, an action of the baffle formed by the sound production device 11 and the anthelix region and the position of the sound production device 11 relative to the earhole may be affected by the distance between the centroid O of the first projection of the sound production device 11 on the sagittal plane and the centroid Q of the projection of the earhole (e.g., the region 1016 enclosed by the dotted line shown in FIGS. 16A-16E) on the sagittal plane, thereby affecting the sound intensity at the earhole. For example, the smaller the distance between the centroid O of the first projection of the sound production device 11 on the sagittal plane and the centroid Q of the projection of the earhole on the sagittal plane, the smaller the contact region between the sound production device 11 and the anthelix region, and the weaker the action of the baffle formed by the sound production device 11 on the anthelix region. However, the increasing overlap ratio of the first projection area of the sound production device 11 on the sagittal plane to the projection area of the auricular concha cavity on the sagittal plane may indicate that the sound hole(s) of the sound production device 11 may be closer to the earhole, so that the sound effect at the earhole may be improved. Therefore, under a premise of a certain whole size and wearing manner of the sound production device 11, the distance between the centroid O of the first projection of the sound production device 11 on the sagittal plane and the centroid Q of the projection of the earhole on the sagittal plane may also be considered significantly.

Figure 18A:
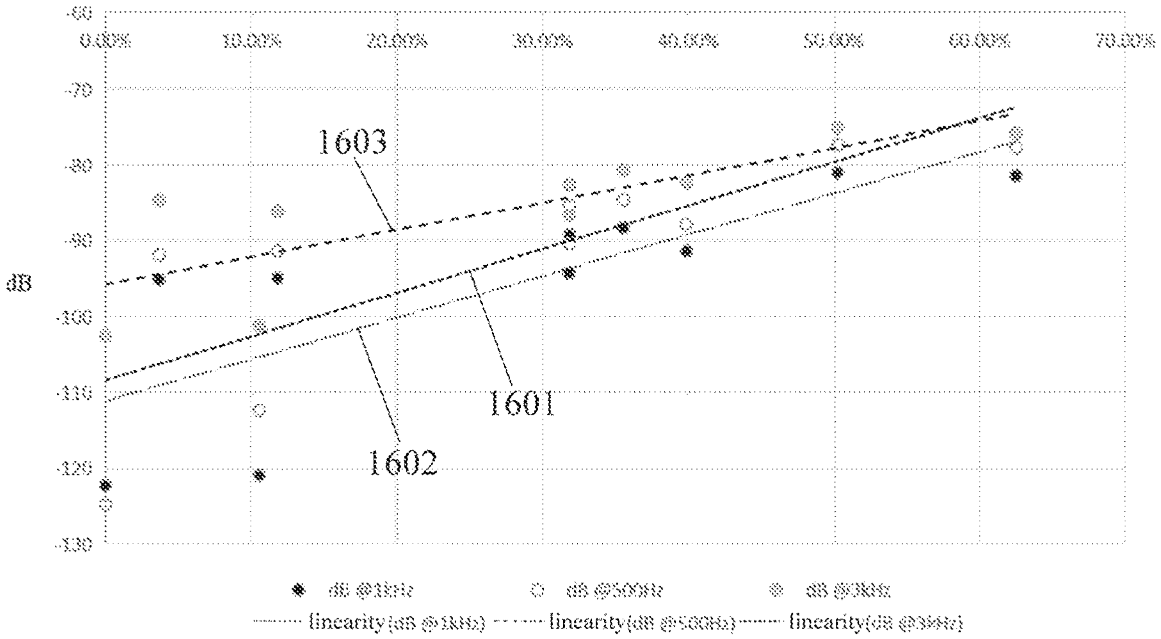
FIG. 18A is a curve diagram illustrating an exemplary frequency response corresponding to different overlap ratios each of which is a ratio of a projection area of a first projection of a sound production device on a sagittal plane to a projection area of an auricular concha cavity of a user on the sagittal plane under a wearing scenario that the sound production device is not inserted into the auricular concha cavity according to some embodiments of the present disclosure.
Figure 18B:
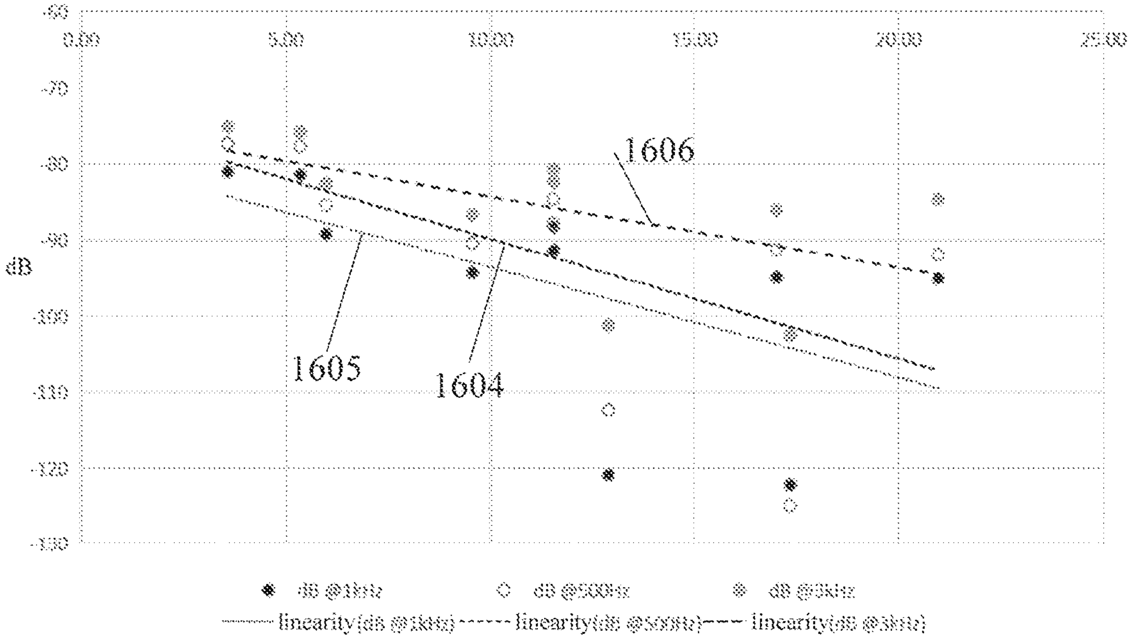
FIG. 18B is a curve diagram illustrating an exemplary frequency response corresponding to different distances between a centroid of a first projection of a sound production device on a sagittal plane and a centroid of a projection of an earhole on the sagittal plane under a wearing scenario that the sound production device is not inserted into an auricular concha cavity according to some embodiments of the present disclosure.

FIG. 18A is a curve diagram illustrating an exemplary frequency response corresponding to different overlap ratios each of which is a ratio of a projection area of a first projection of a sound production device on a sagittal plane to a projection area of an auricular concha cavity of a user on the sagittal plane under a wearing scenario that the sound production device is not inserted into the auricular concha cavity according to some embodiments of the present disclosure. FIG. 18B is a curve diagram illustrating an exemplary frequency response corresponding to different distances between a centroid of a first projection of a sound production device on a sagittal plane and a centroid of a projection of an earhole on the sagittal plane under a wearing scenario that the sound production device is not inserted into an auricular concha cavity according to some embodiments of the present disclosure.

As illustrated in FIG. 18A, an abscissa may represent an overlap ratio of the first projection area of the sound production device 11 on the sagittal plane to the projection area of the auricular concha cavity on the sagittal plane, and an ordinate may represent a sound pressure level at the earhole corresponding to different overlap ratios. A straight line 1601 may represent a linear relationship fitted with the sound pressure level at the earhole according to the overlap ratio of the first projection area to the projection area of the auricular concha cavity on the sagittal plane when the frequency is 500 Hz. A straight line 1602 may represent a linear relationship fitted with the sound pressure level at the earhole according to the overlap ratio of the first projection area to the projection area of the auricular concha cavity on the sagittal plane when the frequency is 1 kHz. A straight line 1603 may represent a linear relationship fitted with the sound pressure level at the earhole according to the overlap ratio of the first projection area to the projection area of the auricular concha cavity on the sagittal plane when the frequency is 3 kHz. A hollow circular point shown in FIG. 18A may be test data corresponding to different overlap ratios of the first projection area to the projection area of the auricular concha cavity on the sagittal plane when the frequency is 500 Hz. A black circular point shown in FIG. 18A may be test data corresponding to different overlap ratios of the first projection area to the projection area of the auricular concha cavity on the sagittal plane when the frequency is 1 kHz. A circular point with a smaller gray value shown in FIG. 18A may be test data corresponding to different overlap ratios of the first projection area to the projection area of the auricular concha cavity on the sagittal plane when the frequency is 3 kHz. As illustrated in FIG. 18A, under different frequencies, the overlap ratio of the first projection area to the projection area of the auricular concha cavity on the sagittal plane and the sound pressure level at the earhole may be in a substantially linear change. When the overlap ratio of the first projection area of the sound production device 11 on the sagittal plane to the projection area of the auricular concha cavity on the sagittal plane is greater than 10%, the sound with a specific frequency (e.g., 500 Hz, 1 kHz, and 3 kHz) at the earhole obtained through the measurement may be increased significantly compared with a condition that the first projection area of the sound production device 11 on the sagittal plane does not overlap (the overlap ratio is 0) with the projection area of the auricular concha cavity on the sagittal plane. In addition, since a too large overlap ratio of the first projection area of the sound production device 11 on the sagittal plane to the projection area of the auricular concha cavity on the sagittal plane may affect the open state of the earhole, thereby affecting the user to receive the sound from the outer environment, thus, the overlap ratio of the first projection area of the sound production device 11 on the sagittal plane to the projection area of the auricular concha cavity on the sagittal plane should not be too large. For example, the overlap ratio of the first projection area of the sound production device 11 on the sagittal plane to the projection area of the auricular concha cavity on the sagittal plane may be not greater than 62%. Accordingly, to ensure the acoustic output quality of the sound production device 11, the overlap ratio of the first projection area of the sound production device 11 on the sagittal plane to the projection area of the auricular concha cavity on the sagittal plane may be within a range of 10%-60%. Preferably, the overlap ratio of the first projection area of the sound production device 11 on the sagittal plane to the projection area of the auricular concha cavity on the sagittal plane may be within a range of 10%-45%. Preferably, the overlap ratio of the first projection area of the sound production device 11 on the sagittal plane to the projection area of the auricular concha cavity on the sagittal plane may be within a range of 11.82%-40%. Preferably, the overlap ratio of the first projection area of the sound production device 11 on the sagittal plane to the projection area of the auricular concha cavity on the sagittal plane may be within a range of 18%-38%. Preferably, the overlap ratio of the first projection area of the sound production device 11 on the sagittal plane to the projection area of the auricular concha cavity on the sagittal plane may be within a range of 25%-38%.

As illustrated in FIG. 18B, an abscissa may represent a distance between a centroid O of the first projection of the sound production device 11 on the sagittal plane and a centroid Q of the projection of the earhole on the sagittal plane, and an ordinate may represent a sound pressure level at the earhole corresponding to different distances. A straight line 1604 may represent a linear relationship between the sound pressure level at the earhole and the distance between the centroid O of the first projection of the sound production device 11 on the sagittal plane and the centroid Q of the projection of the earhole on the sagittal plane when the frequency is 500 Hz under an ideal state. A straight line 1605 may represent a linear relationship between the sound pressure level at the earhole and the distance between the centroid O of the first projection of the sound production device 11 on the sagittal plane and the centroid Q of the projection of the earhole on the sagittal plane when the frequency is 1 kHz. A straight line 1606 may represent a linear relationship between the sound pressure level at the earhole and the distance between the centroid O of the first projection of the sound production device 11 on the sagittal plane and the centroid Q of the projection of the earhole on the sagittal plane when the frequency is 3 kHz. A hollow circular point shown in FIG. 18B may be test data corresponding to different distances between the centroid O of the first projection of the sound production device 11 on the sagittal plane and the centroid Q of the projection of the earhole on the sagittal plane when the frequency is 500 Hz. A black circular point shown in FIG. 18B may be test data corresponding to different distances between the centroid O of the first projection of the sound production device 11 on the sagittal plane and the centroid Q of the projection of the earhole on the sagittal plane when the frequency is 1 kHz. A circular point with a smaller gray value shown in FIG. 18B may be test data corresponding to different distances between the centroid O of the first projection of the sound production device 11 on the sagittal plane and the centroid Q of the projection of the earhole on the sagittal plane when the frequency is 3 kHz. As illustrated in FIG. 18B, under different frequencies, the distance between the centroid O of the first projection of the sound production device 11 on the sagittal plane and the centroid Q of the projection of the earhole on the sagittal plane may be substantially negative correlation to the sound pressure level at the earhole. As a whole, the sound with a specific frequency (e.g., 500 Hz, 1 kHz, and 3 kHz) at the earhole obtained through the measurement may be reduced with an increasing of the distance between the centroid O of the first projection of the sound production device 11 on the sagittal plane and the centroid Q of the projection of the earhole on the sagittal plane. Combined with FIG. 18A and FIG. 18B, the greater the distance between the centroid O of the first projection of the sound production device 11 on the sagittal plane and the centroid Q of the projection of the earhole on the sagittal plane is, the less the overlap ratio of the first projection area of the sound production device 11 on the sagittal plane to the projection area of the earhole on the sagittal plane is. The overlap ratio may affect a relative position between the sound hole(s) of the sound production device 11 and the earhole. For example, the greater the distance between the centroid O of the first projection of the sound production device 11 on the sagittal plane and the centroid Q of the projection of the earhole on the sagittal plane is, the greater the overlap ratio is. At this time, the sound hole(s) of the sound production device 11 may be closer to the earhole, and the better the sound effect at the earhole. In addition, when the distance between the centroid O of the first projection of the sound production device 11 on the sagittal plane and the centroid Q of the projection of the earhole on the sagittal plane is too small, the overlap ratio of the first projection area of the sound production device 11 on the sagittal plane to the projection area of the earhole on the sagittal plane may be too large, so that the sound production device 11 may cover the earhole of the user, thereby affecting the user to receive the sound from the outer environment. As illustrated in FIG. 18B, taking the frequency 3 kHz as an example, when the distance between the centroid O of the first projection of the sound production device 11 on the sagittal plane and the centroid Q of the projection of the earhole on the sagittal plane is 4 mm, 5.8 mm, and 12 mm, the sound pressure level at the earhole obtained through the measurement may be −73 dB, −76 dB, and −82 dB respectively; when the distance between the centroid O of the first projection of the sound production device 11 on the sagittal plane and the centroid Q of the projection of the earhole on the sagittal plane is 17 mm and 22 mm, the sound pressure level at the earhole obtained through the measurement may be −85 dB and −83 dB respectively. Accordingly, the distance between the centroid O of the first projection of the sound production device 11 on the sagittal plane and the centroid Q of the projection of the earhole on the sagittal plane should not be too large. In some embodiments, to ensure a good acoustic output quality (e.g., the sound pressure level at the earhole is greater than −82 dB) when the open earphone is under the wearing state and to ensure that the user may receive the sound information from the outer environment, the distance between the centroid O of the first projection of the sound production device 11 on the sagittal plane and the centroid Q of the projection of the earhole on the sagittal plane may be within a range of 3 mm-13 mm. Preferably, the distance between the centroid O of the first projection of the sound production device 11 on the sagittal plane and the centroid Q of the projection of the earhole on the sagittal plane may be within a range of 4 mm-10 mm. Preferably, the distance between the centroid O of the first projection of the sound production device 11 on the sagittal plane and the centroid Q of the projection of the earhole on the sagittal plane may be within a range of 4 mm-7 mm. Preferably, the distance between the centroid O of the first projection of the sound production device 11 on the sagittal plane and the centroid Q of the projection of the earhole on the sagittal plane may be within a range of 4 mm-6 mm.

It should be noted that the frequency response curves corresponding to different overlap ratios, the centroid of the first projection, and the centroid of the projection of the earhole on the sagittal plane obtained through the measurement in the embodiments of the present disclosure may be obtained through the measurement by changing the wearing position (e.g., translation along the sagittal axis direction) of the sound production device based on a certain wearing angle (an angle between the upper sidewall or the lower sidewall and the horizontal direction, e.g., an angle between the upper sidewall and the horizontal direction is 0°), a certain size along the long axis direction, a certain size along the short axis direction, and a certain size along the thickness direction.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms “one embodiment,” “an embodiment,” and/or “some embodiments” mean that a particular feature, structure or characteristic described in connection with the embodiment is included in at least one embodiment of the present disclosure. Therefore, it is emphasized and should be appreciated that two or more references to “an embodiment” or “one embodiment” or “an alternative embodiment” in various portions of this specification are not necessarily all referring to the same embodiment. Furthermore, the particular features, structures or characteristics may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An open earphone, comprising:

a sound production device; and an ear hook including a first part and a second part connected in sequence, the first part being hooked and arranged between an auricle and a head of a user, the second part extending to a front lateral surface of the auricle and being connected to the sound production device, and the sound production device being worn at a position that is near an ear canal without blocking an earhole of the user, wherein the sound production device at least partially overlaps an anthelix of the user, an overlap ratio of a projection area of the sound production device on a sagittal plane to a projection area of the auricular concha cavity on the sagittal plane is not less than 11.82%.

2. The open earphone of claim 1, wherein the overlap ratio of the projection area of the sound production device on the sagittal plane to the projection area of the auricular concha cavity on the sagittal plane is not less than 31.83%.

3. The open earphone of claim 1, wherein the projection area of the sound production device on the sagittal plane is within a range of 236 $mm^2$-565 $mm^2$.

4. The open earphone of claim 1, wherein a projection of an end of the sound production device on the sagittal plane is located at a region between a projection of an edge of the auricular concha cavity on the sagittal plane and a projection of an inner contour of the auricle on the sagittal plane.

5. The open earphone of claim 1, wherein a distance between a projection of an end of the sound production device on the sagittal plane and a projection of an inner contour of the auricle on the sagittal plane is not greater than 8 mm.

6. The open earphone of claim 5, wherein the end of the sound production device is configured to abut against the inner contour of the auricle.

7. The open earphone of claim 5, wherein an angle of a projection of a top sidewall or a lower sidewall of the sound production device on the sagittal plane relative to a horizontal direction is within a range of 28°-43° under a wearing state, and the distance between the projection of the end of the sound production device on the sagittal plane and the projection of the inner contour of the auricle on the sagittal plane is not greater than 8 mm.

8. The open earphone of claim 5, wherein an angle of a projection of a top sidewall or a lower sidewall of the sound production device on the sagittal plane relative to a horizontal direction is within a range of 0°-20° under a wearing state, and the distance between the projection of the end of the sound production device on the sagittal plane and the projection of the inner contour of the auricle on the sagittal plane is not greater than 6 mm.

9. The open earphone of claim 1, wherein a distance between a centroid of a projection of the sound production device on the sagittal plane and a centroid of a projection of the earhole on the sagittal plane is within a range of 4 mm-7 mm.

10. The open earphone of claim 1, wherein a projection shape of the sound production device on the sagittal plane includes a long axis direction and a short axis direction, and the projection shape satisfies a condition including at least one of:

a size of the projection shape along the long axis direction is within a range of 21 mm-33 mm, or a size of the projection shape along the short axis direction is within a range of 11 mm-18 mm.

11. The open earphone of claim 10, wherein a ratio of the size of the projection shape along the long axis direction to the size of the projection shape along the short axis direction is within a range of 1.4-2.4.

12. The open earphone of claim 1, wherein a thickness of the sound production device is in a range of 6 mm-12 mm.

13. An open earphone, comprising:

a sound production device; and an ear hook including a first part and a second part connected in sequence, the first part being hooked and arranged between an auricle and a head of a user, the second part extending to a front lateral surface of the auricle and being connected to the sound production device, and the sound production device being worn at a position that is near an ear canal without blocking an earhole of the user, wherein the sound production device at least partially overlaps an anthelix of the user, a distance between a projection of an end of the sound production device on a sagittal plane and a projection of an inner contour of the auricle on the sagittal plane is not greater than 8 mm.

14. The open earphone of claim 13, wherein the projection of the end of the sound production device on the sagittal plane is located at a region between a projection of an edge of an auricular concha cavity on the sagittal plane and the projection of the inner contour of the auricle on the sagittal plane.

15. The open earphone of claim 13, wherein an overlap ratio of a projection area of the sound production device on the sagittal plane to a projection area of the auricular concha cavity on the sagittal plane is not less than 11.82%.

16. The open earphone of claim 13, wherein a projection area of the sound production device on the sagittal plane is within a range of 236 $mm^2$-565 $mm^2$.

* * * * *